(12) United States Patent
Kim et al.

(10) Patent No.: US 11,893,063 B2
(45) Date of Patent: Feb. 6, 2024

(54) ELECTRONIC DEVICE AND OPERATION METHOD THEREOF

(71) Applicant: Samsung Electronics Co., Ltd., Suwon-si (KR)

(72) Inventors: Sangdeug Kim, Suwon-si (KR); Dongjun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/052,795

(22) PCT Filed: May 3, 2019

(86) PCT No.: PCT/KR2019/005322
§ 371 (c)(1),
(2) Date: Nov. 3, 2020

(87) PCT Pub. No.: WO2019/212283
PCT Pub. Date: Nov. 7, 2019

(65) Prior Publication Data
US 2021/0263975 A1   Aug. 26, 2021

(30) Foreign Application Priority Data
May 3, 2018   (KR) .................. 10-2018-0051463

(51) Int. Cl.
G06F 7/00   (2006.01)
G06F 16/903   (2019.01)
(Continued)

(52) U.S. Cl.
CPC ...... *G06F 16/90335* (2019.01); *G06F 16/907* (2019.01); *G06F 16/90332* (2019.01);
(Continued)

(58) Field of Classification Search
CPC .. G06F 16/907; G06F 16/9574; G06F 16/953; G06F 16/90335; G06F 16/90332; G06N 20/00; G06Q 30/0277
(Continued)

(56) References Cited

U.S. PATENT DOCUMENTS 9,916,386 B2   3/2018   Qin et al.
2007/0094042 A1   4/2007   Ramer et al.
(Continued)

FOREIGN PATENT DOCUMENTS

CN   101963966 A   2/2011
CN   103942279 A   7/2014
(Continued)

OTHER PUBLICATIONS

China National Intellectual Property Administration, "Notification of the Second Office Action", dated Nov. 3, 2021, in connection with Chinese Patent Application No. 201980029819.1, 22 pages.
(Continued)

*Primary Examiner* — Md I Uddin

(57) ABSTRACT

Provided are an electronic device and an operating method thereof. The electronic device includes a communicator, a display, and a processor configured to receive search result data based on a search keyword from a first server through the communicator, request, from a second server through the communicator, additional information indicating whether each web page included in the search result data is an advertising page, and control the display to display the search result data, based on the additional information corresponding to the each web page and received from the second server, wherein the additional information is generated by the second server by using a training model trained using an artificial intelligence (AI) algorithm, based on whether the web page includes an advertisement pattern.
(Continued)

Also provided are an AI system using a machine learning algorithm such as deep learning and applications thereof.

13 Claims, 22 Drawing Sheets

(51) Int. Cl.
  *G06F 16/907* (2019.01)
  *G06F 16/957* (2019.01)
  *G06F 16/953* (2019.01)
  *G06F 16/9032* (2019.01)
  *G06N 20/00* (2019.01)
  *G06Q 30/0241* (2023.01)

(52) U.S. Cl.
  CPC ........ *G06F 16/953* (2019.01); *G06F 16/9574* (2019.01); *G06N 20/00* (2019.01); *G06Q 30/0277* (2013.01)

(58) Field of Classification Search
  USPC ................................ 707/736, 759, 769, 770
  See application file for complete search history.

(56) References Cited

U.S. PATENT DOCUMENTS

| | | | | |
|---|---|---|---|---|
| 2009/0144141 | A1* | 6/2009 | Dominowska | G06Q 30/02 705/14.41 |
| 2011/0179009 | A1 | 7/2011 | Nam | |
| 2011/0258049 | A1* | 10/2011 | Ramer | G06Q 30/0273 705/14.69 |
| 2014/0188593 | A1* | 7/2014 | Sun | G06Q 30/0256 705/14.41 |
| 2015/0046270 | A1 | 2/2015 | Kocabiyik | |
| 2017/0220209 | A1 | 8/2017 | Bae | |

FOREIGN PATENT DOCUMENTS

| | | | |
|---|---|---|---|
| CN | 106354836 A | 1/2017 | |
| CN | 106682677 A | 5/2017 | |
| CN | 107506367 A | 12/2017 | |
| KR | 10-2009-0106250 A | 10/2009 | |
| KR | 10-2009-0131749 A | 12/2009 | |
| KR | 10-2010-0034140 A | 4/2010 | |
| KR | 10-2016-0063498 A | 6/2016 | |
| KR | 10-2017-0092312 A | 8/2017 | |
| WO | 2016/085105 A1 | 6/2016 | |

OTHER PUBLICATIONS

State Intellectual Property Office of the People's Republic of China, "Notification of the First Office Action" dated Mar. 22, 2021, in connection with Chinese Patent Application No. 201980029819.1, 25 pages.
International Search Report dated Aug. 16, 2019 in connection with International Patent Application No. PCT/KR2019/005322, 2 pages.
Notification of the Third Office Action dated Feb. 16, 2022, in connection with Chinese Application No. 201980029819.1, 19 pages.
Request for the Submission of an Opinion dated Aug. 8, 2022 in connection with Korean Patent Application No. 10-2018-0051463, 12 pages.
Rejection Decision dated May 18, 2022, in connection with Chinese Application No. 201980029819.1, 30 pages.
Notice of Decision to Refuse dated Feb. 1, 2023, in connection with Korean Patent Application No. 10-2018-0051463, 6 pages.

* cited by examiner

FIG. 5

ADVERTISING PROBABILITY SCORE = A*Aw + B*Bw + C — 501

A: FIRST SCORE BASED ON ACCESS HISTORY INFORMATION OF WEB PAGE

Aw: WEIGHT FOR A

B : SECOND SCORE BASED ON PREFERENCE INFORMATION CORRESPONDING TO SPECIFIC USER

Bw : WEIGHT FOR B

C : THIRD SCORE BASED ON WHETHER WEB PAGE INCLUDES ADVERTISEMENT PATTERN

ELECTRONIC DEVICE AND OPERATION METHOD THEREOF

CROSS-REFERENCE TO RELATED APPLICATIONS

This application is a 371 of International Application No. PCT/KR2019/005322 filed on May 3, 2019, which claims priority to Korean Patent Application No. 10-2018-0051463 filed on May 3, 2018, the disclosures of which are herein incorporated by reference in their entirety.

BACKGROUND

1. Field

The disclosure relates to an electronic device and an operating method thereof.

The disclosure also relates to an artificial intelligence (AI) system using a machine learning algorithm such as deep learning and applications thereof.

2. Description of Related Art

Artificial intelligence (AI) systems are computer systems capable of implementing human-level intelligence, and refer to systems in which a machine autonomously learns, makes determinations, and becomes smarter unlike existing rule-based smart systems. A recognition rate may be increased and user preferences may be understood more accurately in proportion to the number of iterations of the AI systems, and thus, the existing rule-based smart systems have been gradually replaced by AI systems based on deep learning.

AI technology includes machine learning (or deep learning) and element technologies using machine learning.

Machine learning refers to an algorithm technology for autonomously classifying/learning features of input data, and the element technologies refer to technologies using the machine learning algorithm such as deep learning, and include fields of technologies such as linguistic understanding, visual understanding, inference/prediction, knowledge representation, and operation control.

Examples of various fields to which the AI technology is applicable are as described below. Linguistic understanding refers to a technology for recognizing and applying/processing languages/characters of humans, and includes natural language processing, machine translation, dialogue systems, queries and responses, voice recognition/synthesis, etc. Visual understanding refers to a technology for recognizing and processing an object like human vision, and includes object recognition, object tracking, image search, human recognition, scene understanding, spatial understanding, image enhancement, etc. Inference/prediction refers to a technology for determining information and logically performing inference and prediction, and includes knowledge/probability-based inference, optimized prediction, preference-based planning, recommendation, etc. Knowledge representation refers to a technology for automatically processing human experience information to knowledge data, and includes knowledge construction (data generation/classification), knowledge management (data utilization), etc. Operation control refers to a technology for autonomous driving of vehicles and motion control of robots, and includes motion control (e.g., navigation, collision avoidance, and driving control), manipulation control (e.g., action control), etc.

Provided are an electronic device and an operating method thereof. Also provided is a computer-readable recording medium having recorded thereon a program for executing the above-described method on a computer. Technical problems to be solved are not limited to the above-described technical problems, and other technical problems may also be present.

SUMMARY

According to an aspect of the disclosure, an electronic device includes a communicator, a display, and a processor configured to receive search result data based on a search keyword from a first server through the communicator, request, from a second server through the communicator, additional information indicating whether each web page included in the search result data is an advertising page, and control the display to display the search result data, based on the additional information corresponding to the each web page and received from the second server, wherein the additional information is generated by the second server by using a training model trained using an artificial intelligence (AI) algorithm, based on whether the web page includes an advertisement pattern.

According to another aspect of the disclosure, an operating method of an electronic device includes receiving search result data based on a search keyword from a first server, requesting, from a second server, additional information indicating whether each web page included in the search result data is an advertising page, and controlling a display to display the search result data, based on the additional information corresponding to the each web page and received from the second server, wherein the additional information is generated by the second server by using a training model trained using an artificial intelligence (AI) algorithm, based on whether the web page includes an advertisement pattern.

According to another aspect of the disclosure, an electronic device includes a communicator, a display, and a processor configured to receive search result data based on a search keyword from an external electronic device through the communicator, generate additional information indicating whether each web page included in the search result data is an advertising page, and transmit the additional information through the communicator to the external electronic device, wherein the processor is further configured to generate the additional information by using a training model trained using an artificial intelligence (AI) algorithm, based on whether the web page includes an advertisement pattern.

According to another aspect of the disclosure, an operating method of an electronic device includes receiving search result data based on a search keyword from an external electronic device, generating additional information indicating whether each web page included in the search result data is an advertising page, and transmitting the additional information to the external electronic device, wherein the generating of the additional information includes generating the additional information by using a training model trained using an artificial intelligence (AI) algorithm, based on whether the web page includes an advertisement pattern.

According to another aspect of the disclosure, a computer-readable recording medium has recorded thereon a program for executing the above-described method on a computer.

BRIEF DESCRIPTION OF THE DRAWINGS

FIG. 5 is a diagram for describing an example in which a second server generates additional information indicating whether a web page is an advertising page, according to an embodiment.

DETAILED DESCRIPTION

Figure 1:
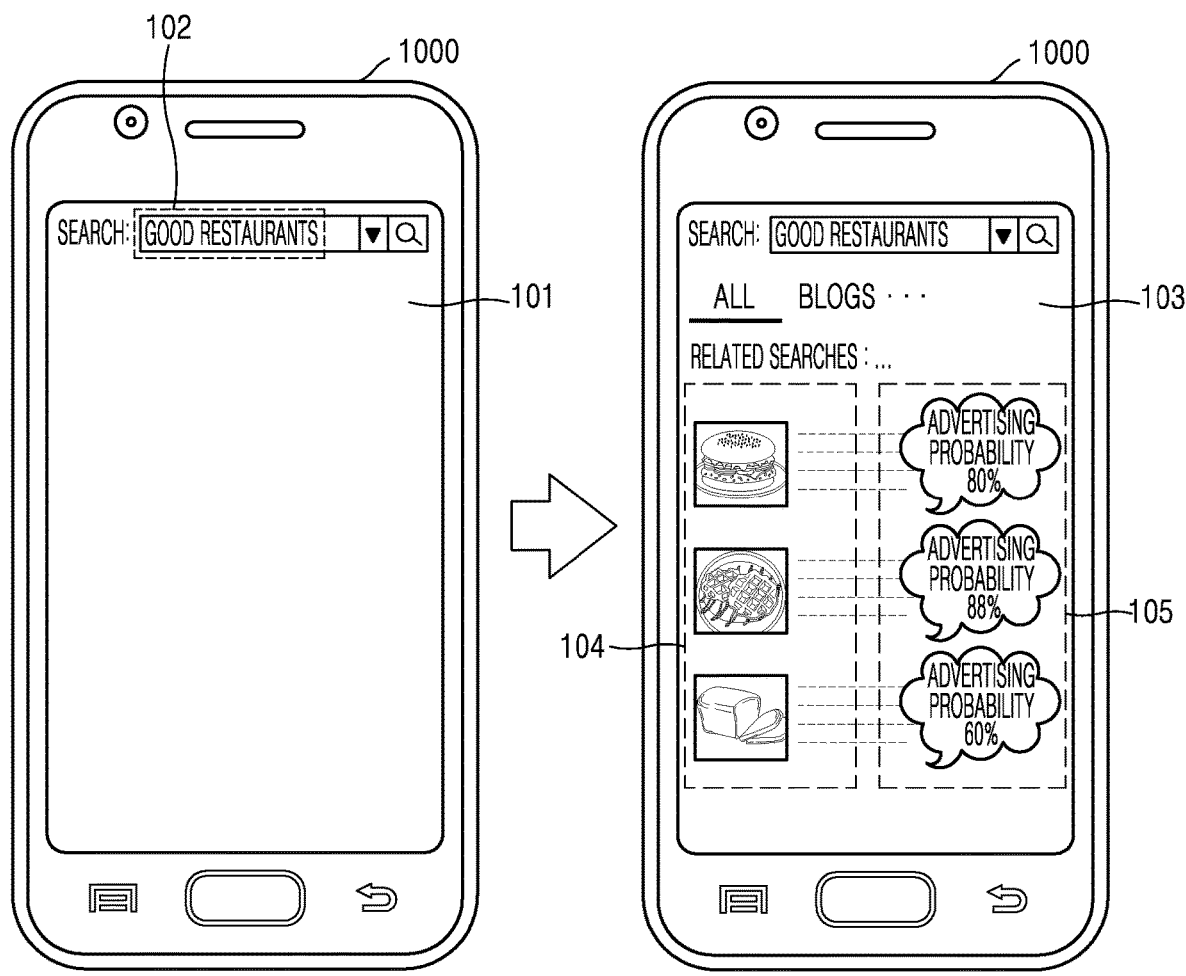
FIG. 1 is a diagram showing an example of operation of an electronic device, according to an embodiment.

Hereinafter, the disclosure will be described in detail by explaining embodiments of the disclosure with reference to the attached drawings. The disclosure may, however, be embodied in many different forms and should not be construed as being limited to the embodiments set forth herein. In the drawings, parts not related to the disclosure are not illustrated for clarity of explanation, and like reference numerals denote like elements throughout.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Therefore, it is noted that the terms used herein are construed based on practical meanings thereof and the whole content of this specification, rather than being simply construed based on names of the terms.

Terms such as "first" and "second" may be used to designate various elements, but the elements should not be limited by these terms. These terms are merely used to distinguish one element from another.

Terms in the following description are merely used to describe specific embodiments, and are not intended to limit the scope of the disclosure. The singular forms "a", "an", and "the" are intended to include the plural forms as well, unless the context clearly indicates otherwise. Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

The definite article "the" or other demonstratives may indicate both a singular form and a plural form. Unless the context clearly indicates otherwise, operations included in a method according to an embodiment of the disclosure may be performed in an appropriate order. The order of describing the operations does not limit the scope of the disclosure.

The phrase "an embodiment of the disclosure" at various parts of this specification does not always designate the same embodiment of the disclosure.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executed by one or more processors. Furthermore, the disclosure might employ known technologies for electronic settings, signal processing, and/or data processing. Terms such as "mechanism", "element", "means", and "configuration" may be widely used and are not limited to mechanical and physical configurations.

In addition, connection lines or connection members between elements shown in the drawings merely illustrate examples of functional connections and/or physical or circuit connections. Connections between elements may be represented by replaceable or additional various functional connections, physical connections, or circuit connections in an actual device.

Reference will now be made in detail to embodiments, examples of which are illustrated in the accompanying drawings.

FIG. 1 is a diagram showing an example of operation of an electronic device 1000, according to an embodiment.

According to an embodiment, when the electronic device 1000 provides results of searching for restaurants, products, or the like by using a search engine, the electronic device 1000 may also provide probability information that web pages, blogs, etc. included in the search results are advertising pages.

As such, because a user may recognize the advertising probabilities in advance without accessing the web pages included in the search results, more effective information may be obtained and a time taken to obtain information desired by the user may be reduced.

As illustrated in FIG. 1, for example, the user may launch a web browser and access a search engine on the electronic device 1000 (e.g., a smartphone). The electronic device 1000 may display a launch screen 101 of the search engine and receive a search keyword 102 (e.g., "good restaurants") for searching for good restaurants. The electronic device 1000 may display, on a display 1210 (see FIGS. 16 and 17), a list 104 of web pages found using the search keyword 102. In this case, the electronic device 1000 may also display probability information 105 that each web page is an advertising page. For example, the electronic device 1000 may display that a probability that a first web page in the list 104 of web pages is an advertising page is 80%. As such, the user may view the list 104 of web pages on a search result screen and recognize web pages having high advertising probabilities.

The electronic device 1000 is illustrated as a smartphone in FIG. 1 according to an embodiment, but is not limited thereto.

The electronic device 1000 according to an embodiment may be implemented as an electronic device including a display or an electronic device connectable to a display. For example, the electronic device 1000 may be implemented as various electronic devices such as a smart television (TV), a set-top box, a tablet personal computer (PC), a digital camera, a laptop computer, a desktop computer, an ebook reader, a digital broadcast receiver, a personal digital assistant (PDA), a portable multimedia player (PMP), a navigation system, an MP3 player, and a wearable device.

FIG. 1 merely illustrates an embodiment and the disclosure is not limited thereto.

Figure 2:
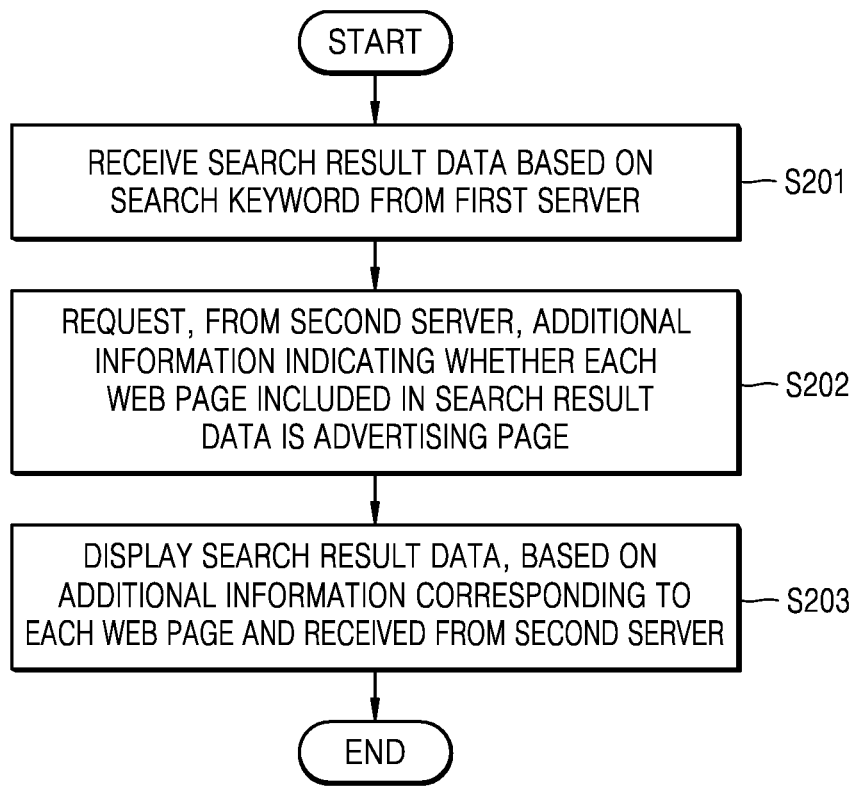
FIG. 2 is a flowchart of an operating method of an electronic device, according to an embodiment.

FIG. 2 is a flowchart of an operating method of the electronic device 1000, according to an embodiment.

In operation S201 of FIG. 2, the electronic device 1000 may receive search result data based on a search keyword from a first server.

Figure 16:
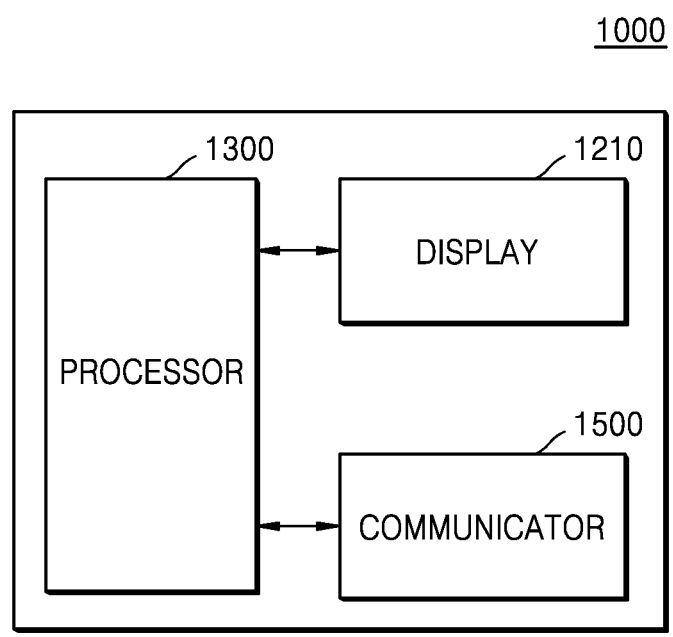
FIG. 16 is a block diagram of an electronic device according to an embodiment.
Figure 17:
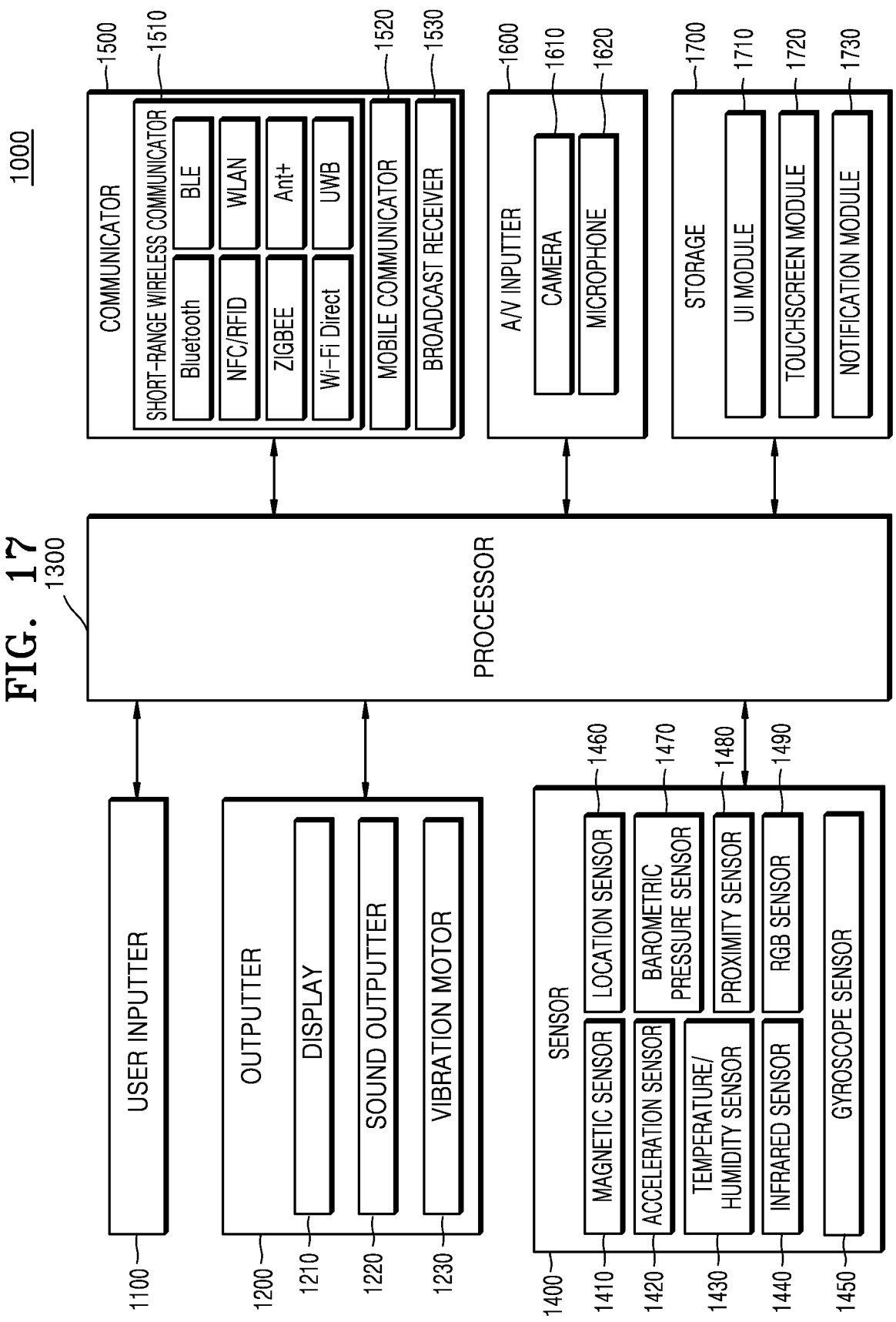
FIG. 17 is a detailed block diagram of an electronic device according to an embodiment.

According to an embodiment, the electronic device 1000 may receive the search keyword from a user and request the search result data based on the search keyword from the first server (e.g., a search engine server) through a communicator 1500 (see FIGS. 16 and 17). The electronic device 1000 may receive the search result data from the first server (e.g., a search engine server) which responds to search requests.

For example, when the search keyword (e.g., "good restaurants") is input through a search engine, the electronic device 1000 may receive the search result data based on the search keyword (e.g., a list of websites, blogs, etc. including good restaurant information) from the first server (e.g., a search engine server).

In operation S202 of FIG. 2, the electronic device 1000 may request, from a second server, additional information indicating whether each web page included in the search result data is an advertising page.

According to an embodiment, before displaying the received search result data on the display 1210, the electronic device 1000 may request the second server to determine whether each web page included in the search result data is an advertising page. The second server may generate the additional information indicating whether each web page included in the search result data is an advertising page, and transmit the additional information to the electronic device 1000.

According to an embodiment, the additional information may include probability information that the web page is an advertising page.

According to an embodiment, the second server may be a server which is pre-trained based on advertising pages. The second server may determine whether the web page includes an advertisement pattern, by using a training model trained using an artificial intelligence (AI) algorithm. The second server may determine whether the web page included in the search result data is an advertising page, based on access history information of the web page and preference information corresponding to a specific user.

The example in which the second server generates the additional information indicating whether the web page is an advertising page, according to an embodiment, will be described in detail below with reference to FIGS. 5 to 12.

In operation S203 of FIG. 2, the electronic device 1000 may display the search result data, based on the additional information corresponding to each web page and received from the second server.

According to an embodiment, the additional information may include probability information that the web page is an advertising page.

According to an embodiment, the electronic device 1000 may display, on the display 1210, a list of web pages included in the search result data, and probability information corresponding to each web page. For example, the electronic device 100 may display a hyperlink to each web page and probability information that each web page is an advertising page (e.g., "advertising probability: 60%").

The electronic device 1000 may determine a list of web pages to be displayed on the display 1210 from among the web pages included in the search result data, based on the additional information corresponding to each web page. According to an embodiment, the electronic device 1000 may exclude web pages of which advertising probability information is greater than or equal to a preset threshold, from among the web pages included in the search result data, from the list of web pages to be displayed on the display 1210. For example, the electronic device 1000 may exclude web pages of which advertising probability information is greater than or equal to 80%, from among the web pages included in the search result data, from the list of web pages to be displayed on the display 1210.

Figure 3:
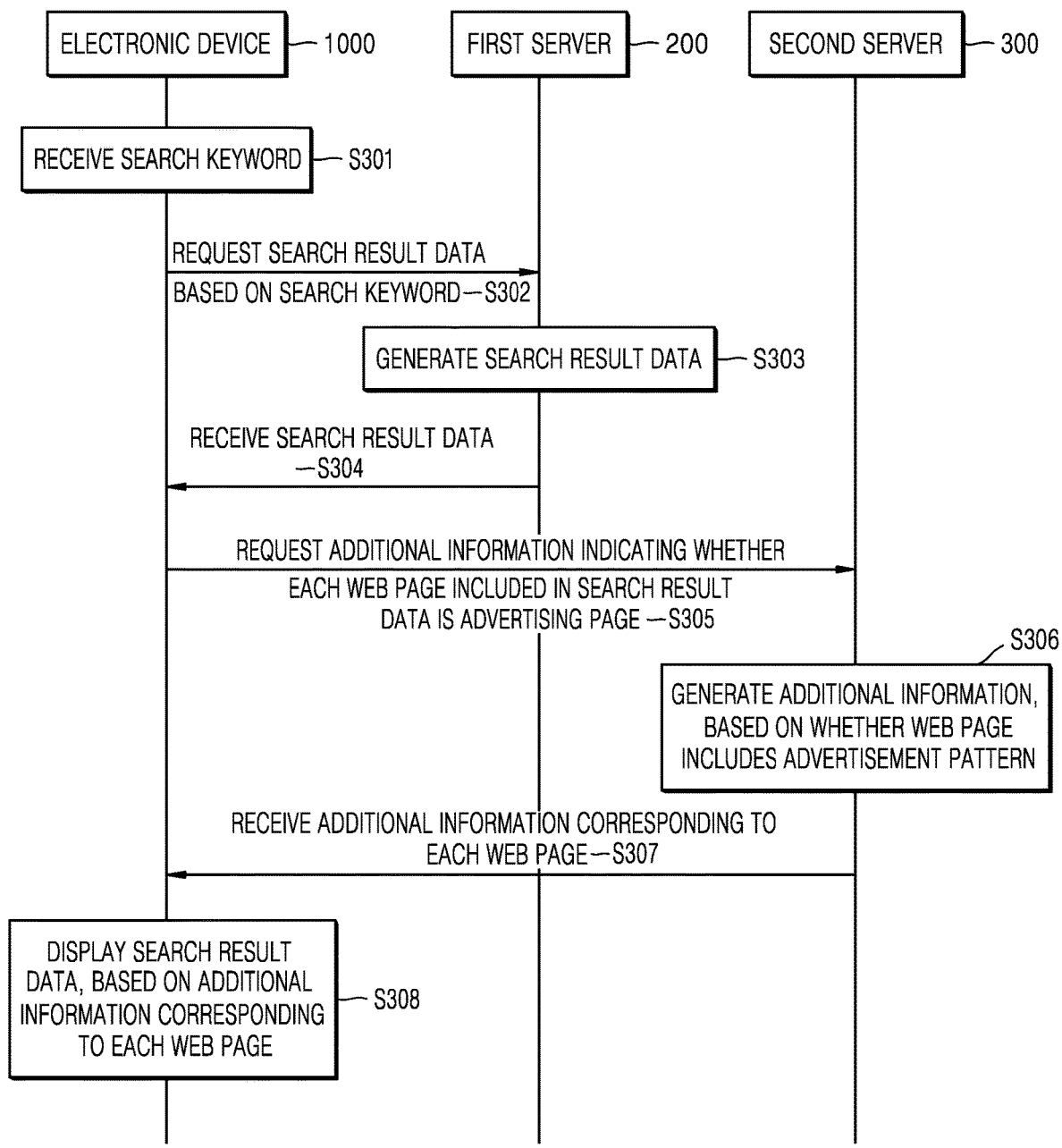
FIG. 3 is a flowchart of an operating method of an electronic device, a first server, and a second server, according to an embodiment.

FIG. 3 is a flowchart of an operating method of the electronic device 1000, a first server 200, and a second server 300, according to an embodiment.

In operation S301 of FIG. 3, the electronic device 1000 may receive a search keyword.

For example, the electronic device 1000 may display, on the display 1210, a launch screen of a search engine accessed through a web browser. The electronic device 1000 may receive the search keyword (e.g., "good restaurants") through a user interface on the launch screen of the search engine.

In operation S302 of FIG. 3, the electronic device 1000 may request search result data based on the search keyword from the first server 200.

For example, the electronic device 1000 may request the search result data based on the search keyword (e.g., a list of websites including the search keyword) from the first server 200 (e.g., a search engine server).

In operation S303 of FIG. 3, the first server 200 may generate the search result data.

For example, the first server 200 (e.g., a search engine server) may generate the search result data including websites, blogs, images, etc. including the search keyword (e.g., "good restaurants"), according to preset search settings.

In operation S304 of FIG. 3, the electronic device 1000 may receive the search result data from the first server 200.

For example, the electronic device 1000 may receive, from the first server 200, the list of web sites including the search keyword (e.g., "good restaurants").

In operation S305 of FIG. 3, the electronic device 1000 may request, from the second server 300, additional information indicating whether each web page included in the search result data is an advertising page.

According to an embodiment, the additional information may include probability information that the web page is an advertising page.

According to an embodiment, the electronic device 1000 may transmit, to the second server 300, uniform resource locator (URL) information of a plurality of web pages included in the search result data, and request, from the second server 300, probability information corresponding to each piece of the URL information.

In operation S306 of FIG. 3, the second server 300 may generate the additional information, based on whether the web page includes an advertisement pattern.

According to an embodiment, the second server 300 may be a server which is pre-trained to determine whether an input web page includes an advertisement pattern.

According to an embodiment, the second server 300 may receive a large number of advertising pages as input data and train a training model (e.g., a data recognition model).

According to an embodiment, the second server 300 may generate probability information that each web page included in the search result data received from the electronic device 1000 is an advertising page, by using an AI algorithm and the trained training model. For example, the second server 300 may generate the probability information corresponding to each web page, e.g., information indicating that an advertising probability of a first web page in the list of the plurality of web pages included in the search result data is 30% and that an advertising probability of a second web page is 50%.

In operation S307 of FIG. 3, the electronic device 1000 may receive, from the second server 300, the additional information corresponding to each web page.

According to an embodiment, the electronic device 1000 may receive the probability information that each web page included in the search result data is an advertising page.

In operation S308 of FIG. 3, the electronic device 1000 may display the search result data, based on the additional information corresponding to each web page.

According to an embodiment, the electronic device 1000 may display, on the display 1210, the list of web pages included in the search result data and the probability information corresponding to each web page (e.g., "advertising probability: 60%").

According to an embodiment, the electronic device 1000 may exclude web pages of which advertising probability information is greater than or equal to the preset threshold (e.g., 80%), from among the web pages included in the search result data, from the list of web pages to be displayed on the display 1210.

FIGS. 2 and 3 merely illustrate an embodiment and the disclosure is not limited thereto.

Figure 4:
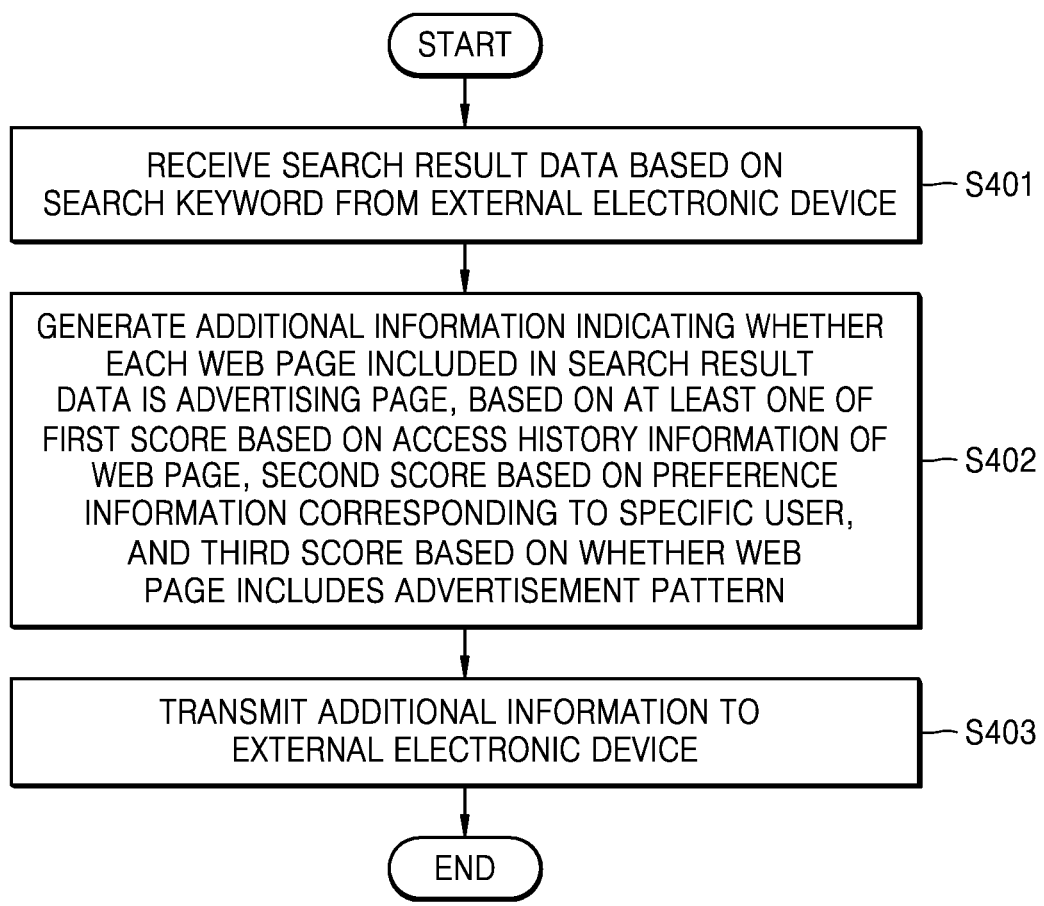
FIG. 4 is a flowchart of an operating method of a second server, according to an embodiment.
Figure 6:
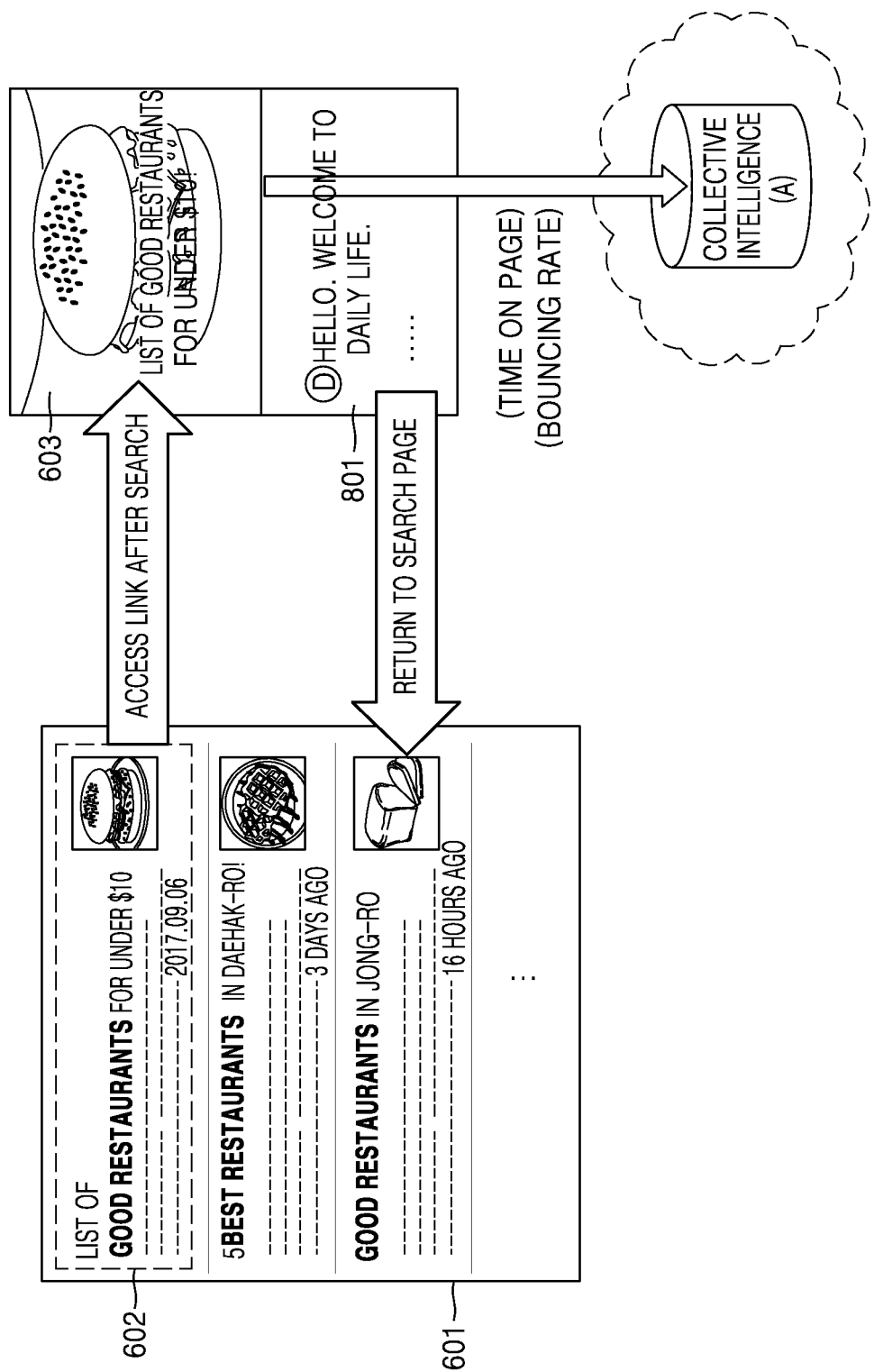
FIG. 6 is a diagram for describing an example in which a second server generates additional information, based on access history information of a web page, according to an embodiment.
Figure 7:
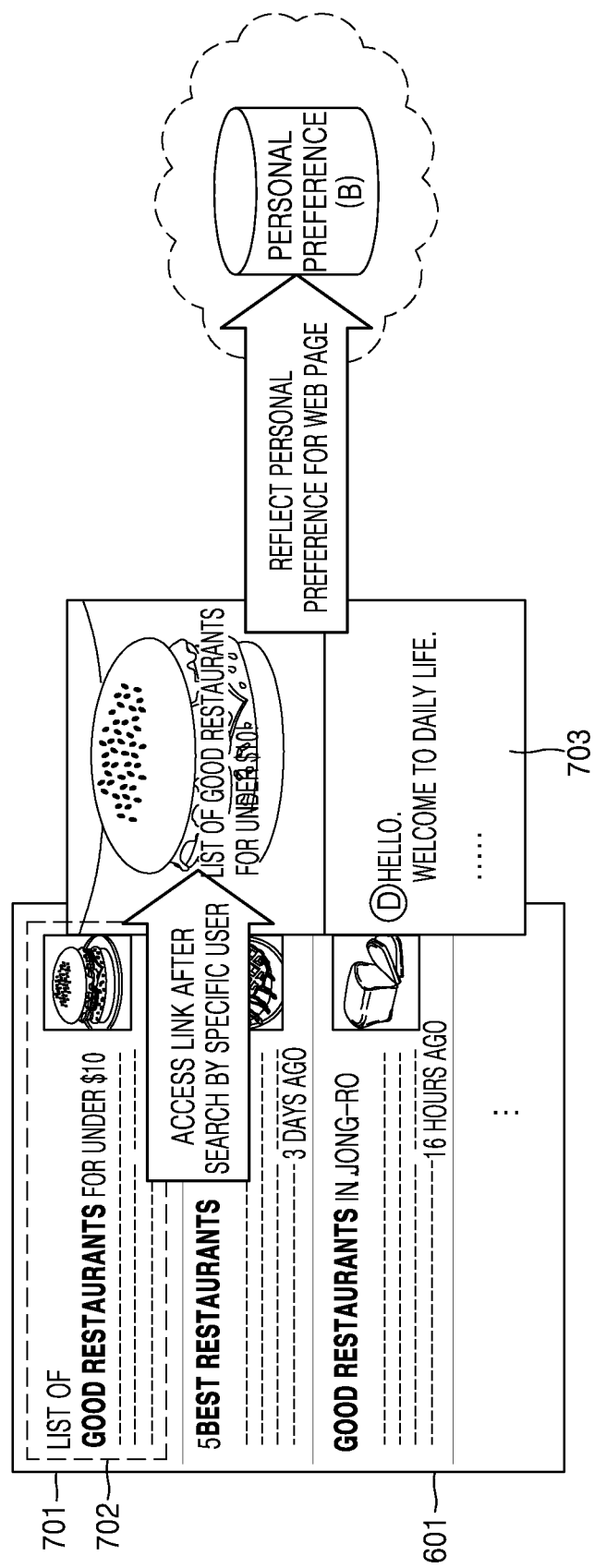
FIGS. 7 and 8 are diagrams for describing an example in which a second server generates additional information, based on preference information corresponding to a specific user, according to an embodiment.
Figure 8:
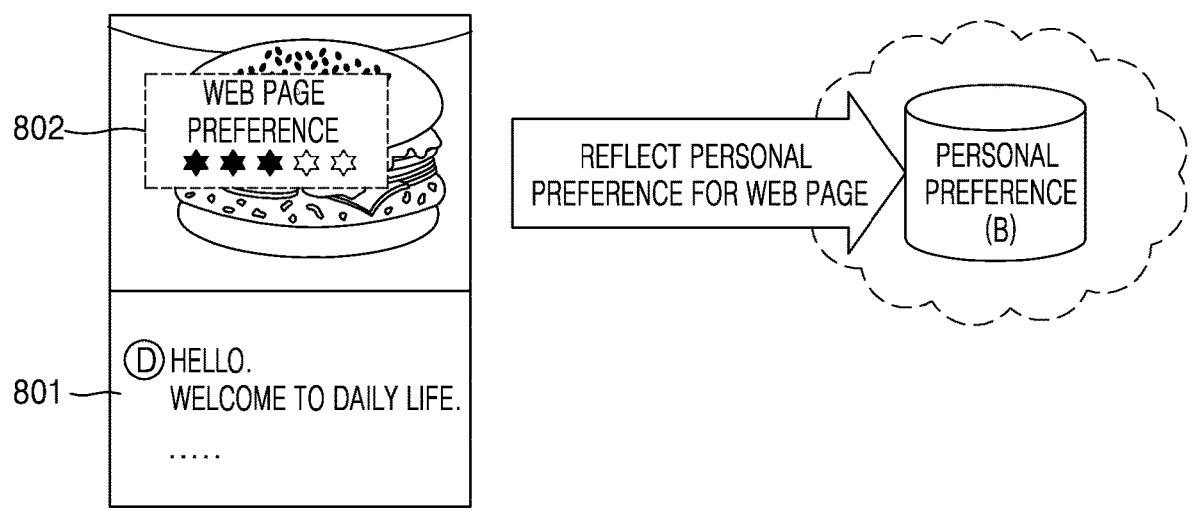

FIG. 4 is a flowchart of an operating method of the second server 300, according to an embodiment. FIG. 5 is a diagram for describing an example in which the second server 300 generates additional information indicating whether a web page is an advertising page, according to an embodiment. FIG. 6 is a diagram for describing an example in which the second server 300 generates additional information, based on access history information of a web page, according to an embodiment. FIGS. 7 and 8 are diagrams for describing an example in which the second server 300 generates additional information, based on preference information corresponding to a specific user, according to an embodiment.

In operation S401 of FIG. 4, the second server 300 may receive search result data based on a search keyword from an external electronic device.

According to an embodiment, the electronic device 1000 may receive the search result data based on the search keyword (e.g., a list of web sites based on the search keyword) from the first server 200 (e.g., a search engine server).

According to an embodiment, the electronic device 1000 may transmit the search result data to the second server 300. The electronic device 1000 may request, from the second server 300, additional information indicating whether each web page included in the search result data is an advertising page. For example, the electronic device 1000 may transmit, to the second server 300, URL information of a plurality of web pages included in the search result data, and request, from the second server 300, probability information corresponding to each piece of the URL information.

In operation S402 of FIG. 4, the second server 300 may generate the additional information indicating whether each web page included in the search result data is an advertising page, based on at least one of a first score based on access history information of the web page, a second score based on preference information corresponding to a specific user, and a third score based on whether the web page includes an advertisement pattern.

According to an embodiment, the additional information indicating whether the web page is an advertising page may include probability information that the web page is an advertising page.

Referring to FIG. 5, the second server 300 may generate the additional information by calculating an advertising probability score of the web page. According to an embodiment, the advertising probability score may be calculated as a probability (%) that the web page is an advertising page.

For example, an advertising probability score 501 may be calculated as a sum (A*Aw+B*Bw+C) of a product of a first score A based on access history information of a specific web page, and a weight Aw for A, a product of a second score B based on preference information corresponding to a specific user, and a weight Bw for B, and a third score C based on whether the web page includes an advertisement pattern.

For example, the advertising probability score may be calculated as the first score A based on the access history information of the specific web page. The advertising probability score may be calculated as the product of the first score A and the weight Aw for A.

The advertising probability score may be calculated as the second score B based on the preference information corresponding to the specific user. The advertising probability score may be calculated as the product of the second score B and the weight Bw for B.

The advertising probability score may be calculated as the third score C based on whether an advertisement pattern is included, which is determined using a training model trained using an AI algorithm.

The advertising probability score may be calculated as a sum of at least one of the first score A, the second score B, and the third score C. The advertising probability score may be calculated as a sum of at least one of the product of the first score A and the weight Aw for A, the product of the second score B and the weight Bw for B, and the third score C.

According to an embodiment, the weight Aw for A and the weight Bw for B may be determined based on priorities of the first score A and the second score B in calculating the advertising probability score. According to an embodiment, the weight Aw for A and the weight Bw for B may be preset or changed by a processor of the second server 300. According to user input, the weight Aw for A and the weight Bw for B may be set or changed.

According to an embodiment, the access history information of the web page may include a time on page from when the web page is accessed until when the access to the web page is terminated.

Referring to FIG. 6, for example, when an input for selecting one 602 in a list of a plurality of web pages included in a search result page 601 is received, the electronic device 1000 accesses a selected web page 603. In this case, a time on page from when the web page is accessed until when the access to the web page is terminated may be considered to determine whether the web page is an advertising page. In general, access to a web page will be terminated after a long time when the accessed web page provides effective information, and will be terminated within a short time when the accessed web page is close to an advertising page.

According to an embodiment, the access history information of the web page may include a bounce rate at which the web page is accessed and then the access to the web page is terminated without further accessing other web pages connectable in the web page.

Referring to FIG. 6, for example, when an input for selecting one 602 in a list of a plurality of web pages included in a search result page 601 is received, the electronic device 1000 accesses a selected web page 603. In this case, a bounce rate at which the access to the web page 603 is terminated without further accessing links to other web pages connectable in the accessed web page 603 may be considered to determine whether the web page 603 is an advertising page. In general, when a web page provides effective information, reliability of and a rate of accessing other web pages connectable in the web page will be high. However, when the web page is close to an advertising page, a rate of terminating the access to the web page within a short time without accessing the other web pages will be high.

According to an embodiment, the preference information corresponding to the specific user may include at least one of the access history information of the web page corresponding to the specific user, and information based on input of the specific user.

Referring to FIG. 7, for example, when an input for selecting one 702 in a list of a plurality of web pages included in a search result page 701 is received, the electronic device 1000 may access a selected web page 703.

The access history information of the web page corresponding to the specific user according to an embodiment may include a time on page from when the specific user accesses the web page until when the specific user terminates the access to the web page. According to an embodiment, the access history information of the web page corresponding to the specific user may include a bounce rate at which the specific user accesses the web page and then terminates the access to the web page without accessing other web pages connectable in the web page.

According to an embodiment, the access history information of the web page corresponding to the specific user may be collected based on web page log-in information of the specific user.

According to an embodiment, the preference information corresponding to the specific user may include information based on input of the specific user.

Referring to FIG. 8, for example, when an input for selecting one in a list of a plurality of web pages included in a search result page is received, the electronic device 1000 may access a selected web page 801. In this case, a user interface 802 for allowing a user to directly input a web page preference may be provided on the accessed web page 801. For example, the user interface 802 for allowing the user to select stars according to the web page preference may be provided.

For example, an interface for allowing the user to select "Good" or "Bad" as the web page preference may be provided and the disclosure is not limited thereto.

According to an embodiment, preference information for a specific web page, which is input by the specific user, may be collected based on the web page log-in information of the specific user.

According to an embodiment, the second server 300 may determine whether the web page is an advertising page, based on a third score based on whether the web page includes an advertisement pattern. The second server 300 may determine whether the web page is an advertising page, by using a training model trained using an AI algorithm.

The example of determining whether the web page includes an advertisement pattern, by using the training model will be described in detail below with reference to FIGS. 9 to 12.

Meanwhile, in operation S403 of FIG. 4, the second server 300 may transmit the additional information to the external electronic device. According to an embodiment, the second server 300 may transmit the probability information that each web page included in the search result data is an advertising page, which is generated in operation S402, to the electronic device 1000. As such, the electronic device 1000 may display the received probability information together with the search result data.

FIGS. 4 to 8 merely illustrate an embodiment and the disclosure is not limited thereto.

FIGS. 9 to 12 are diagrams for describing an example in which the second server 300 generates additional information, based on whether an advertisement pattern is included, which is determined using a training model, according to an embodiment.

Figure 9:
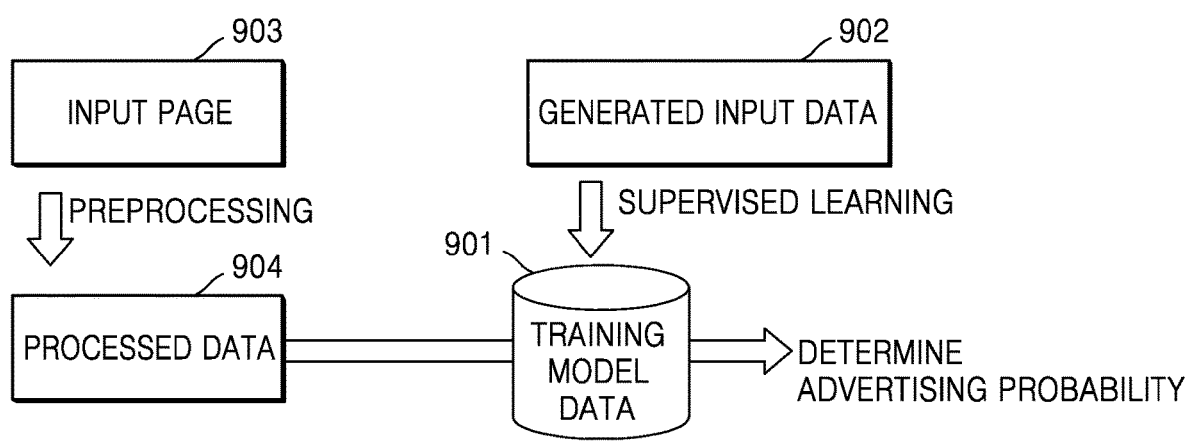
FIGS. 9 to 12 are diagrams for describing an example in which a second server generates additional information, based on whether an advertisement pattern is included, which is determined using a training model, according to an embodiment.

As illustrated in FIG. 9, the second server 300 (see FIG. 3) according to an embodiment may determine whether an input page 903 is an advertising page.

For example, the page 903 may be a web page or a blog including text and images.

According to an embodiment, when the page 903 is input, the second server 300 may perform preprocessing for determining whether the input page 903 is an advertising page.

According to an embodiment, the second server 300 may perform optical character recognition (OCR) to extract text from an image included in the input page 903. For example, a restaurant name, a phone number, or an address may be extracted from a sign or a business card included in the image.

The second server 300 may perform caption generation through image recognition. For example, a caption for describing a food picture included in the web page may be generated.

The second server 300 may perform sentiment analysis on text. For example, it may be determined whether an emotion exhibited by words used in a restaurant review included in the web page is positive or negative.

According to an embodiment, the second server 300 may determine a probability that processed data 904 preprocessed from the input page 903 is an advertising page, by using a training model 901 trained using an AI algorithm.

According to an embodiment, the second server 300 may train the training model 901 through supervised learning using training data as input values.

According to an embodiment, the training data may include a large number of advertising pages.

According to an embodiment, the second server 300 may train the training model 901 through supervised learning using a large number of advertising pages as input values.

According to an embodiment, the second server 300 may obtain a large number of advertising pages through web crawling, and perform supervised learning using a large number of advertising pages as input values.

According to an embodiment, the second server 300 may generate virtual advertising pages to ensure a large amount of training data.

Figure 10:
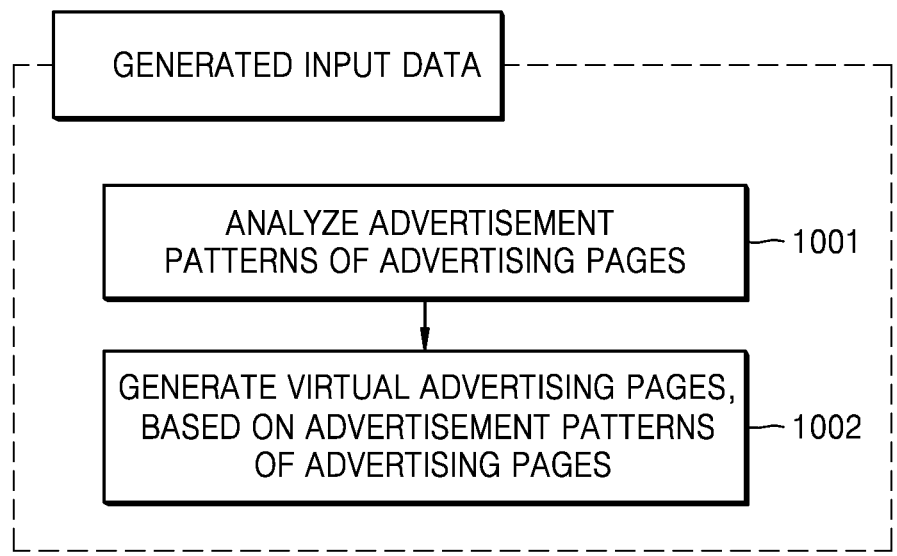

Referring to FIG. 10, the second server 300 (see FIG. 3) according to an embodiment may analyze advertisement patterns of advertising pages (1001).

For example, the advertisement patterns of the advertising pages may include a large number of restaurant names, addresses, phone numbers, sign images, product images, and pictures focused on food. The advertisement patterns may include business card images and map images. The advertisement patterns may include positive expressions and positive emoticons. The advertisement patterns may include specific phrases (e.g., "Written with the support of Restaurant A").

The second server 300 according to an embodiment may generate virtual advertising pages, based on the analyzed advertisement patterns (1002).

The second server 300 according to an embodiment may generate virtual pages including the advertisement patterns. For example, the second server 300 may generate pages including restaurant names, addresses, phone numbers, and homepage hyperlinks, by using publically available restaurant data. For example, the second server 300 may generate pages including sign images and map images, by using publically available map data. For example, the second server 300 may generate pages including business card images. For example, the second server 300 may generate pages including positive expressions and positive emoticons broadly used in advertising pages. For example, the second server 300 may generate pages including specific phrases (e.g., "Written with the support of Restaurant A").

Referring to FIG. 9, according to an embodiment, the second server 300 may train the training model 901 through supervised learning using the generated virtual advertising pages as input values 902.

According to an embodiment, not only a large number of pages obtained through web crawling but also a large number of advertising pages generated by the second server 300 may be used as input values to ensure a large amount of training data of the training model 901. As such, the accuracy of the training model 901 may be increased.

Meanwhile, as illustrated in FIG. 9, according to an embodiment, the second server 300 may obtain the processed data 904 preprocessed from the input page 903, and determine an advertising probability, based on the processed data 904 by using the pre-trained training model 901.

Figure 11:
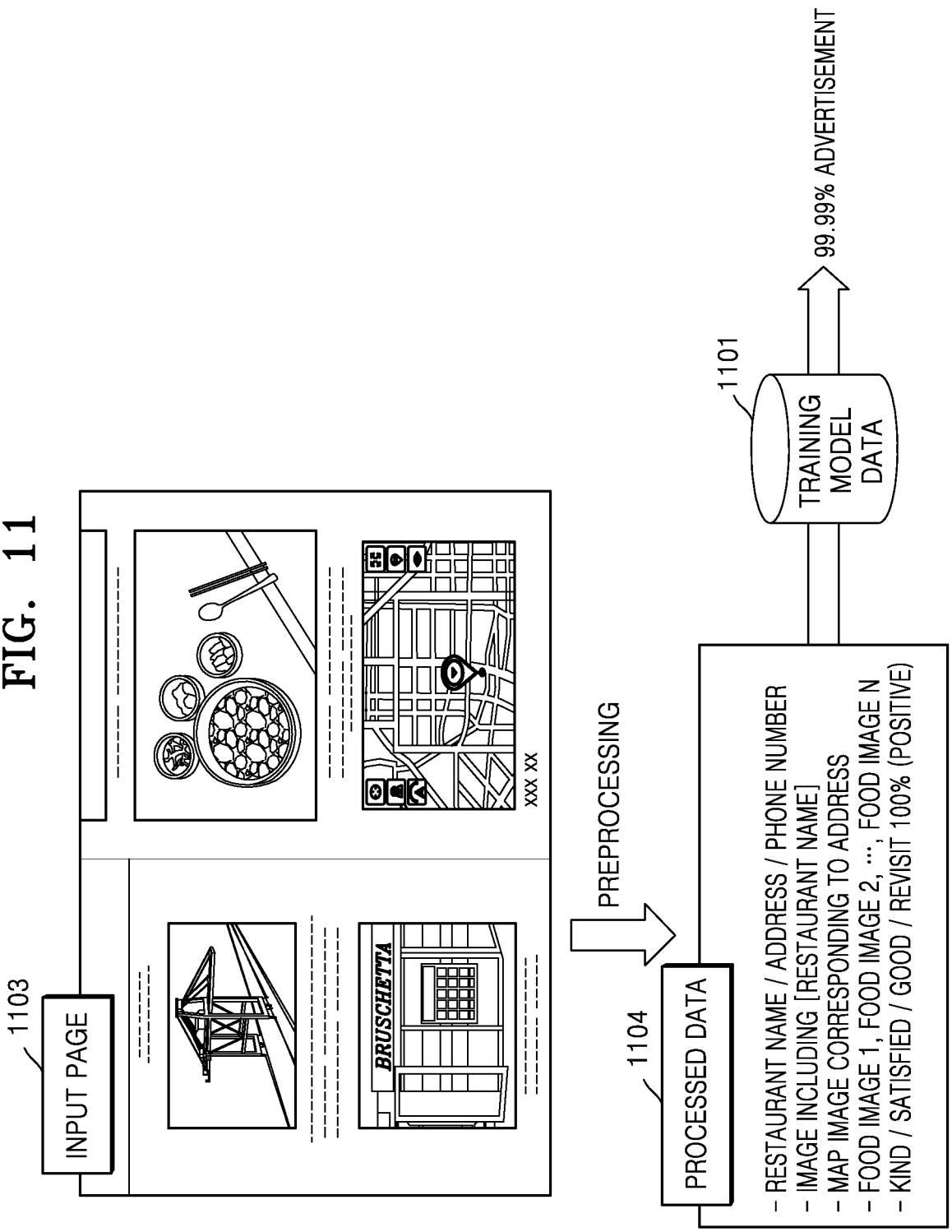

Referring to FIG. 11, according to an embodiment, the second server 300 may obtain processed data 1104 preprocessed from an input web page 1103.

According to an embodiment, the second server 300 may perform, for example, image recognition or text recognition on the input web page 1103. For example, the second server 300 may perform OCR on an image included in the input web page 1103. For example, the second server 300 may perform caption generation through image recognition, or perform sentiment analysis on text.

According to an embodiment, the second server 300 may obtain the processed data 1104, e.g., a restaurant name, an address, a phone number, an image including the restaurant name, a map image corresponding to the address, food images, positive words (e.g., kind, satisfied, good, and revisit 100%) by preprocessing the input web page 1103.

According to an embodiment, the second server 300 may determine an advertising probability (e.g., 99.99%), based on the processed data 1104 by using a pre-trained training model 1101.

Figure 12:
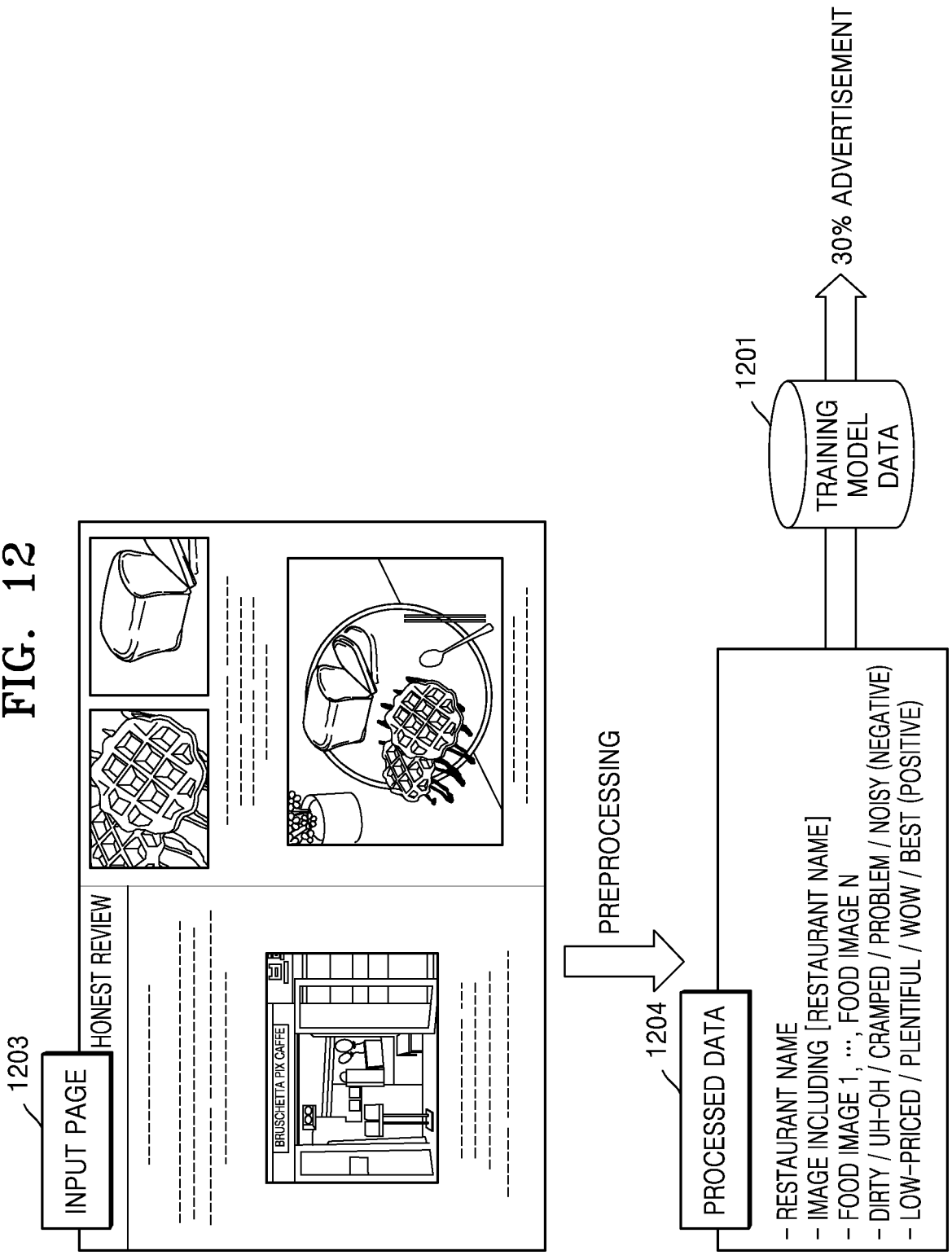

Referring to FIG. 12, according to an embodiment, the second server 300 may obtain processed data 1204 (e.g., a restaurant name, an image including the restaurant name, food images, negative words (e.g., dirty, uh-oh, cramped, problem, and noisy), and positive words (e.g., low-priced, plentiful, wow, and best) preprocessed from an input blog page 1203.

According to an embodiment, the second server 300 may determine an advertising probability (e.g., 30%), based on the processed data 1204 by using a pre-trained training model 1201.

FIGS. 9 to 12 merely illustrate an embodiment and the disclosure is not limited thereto.

Figure 13:
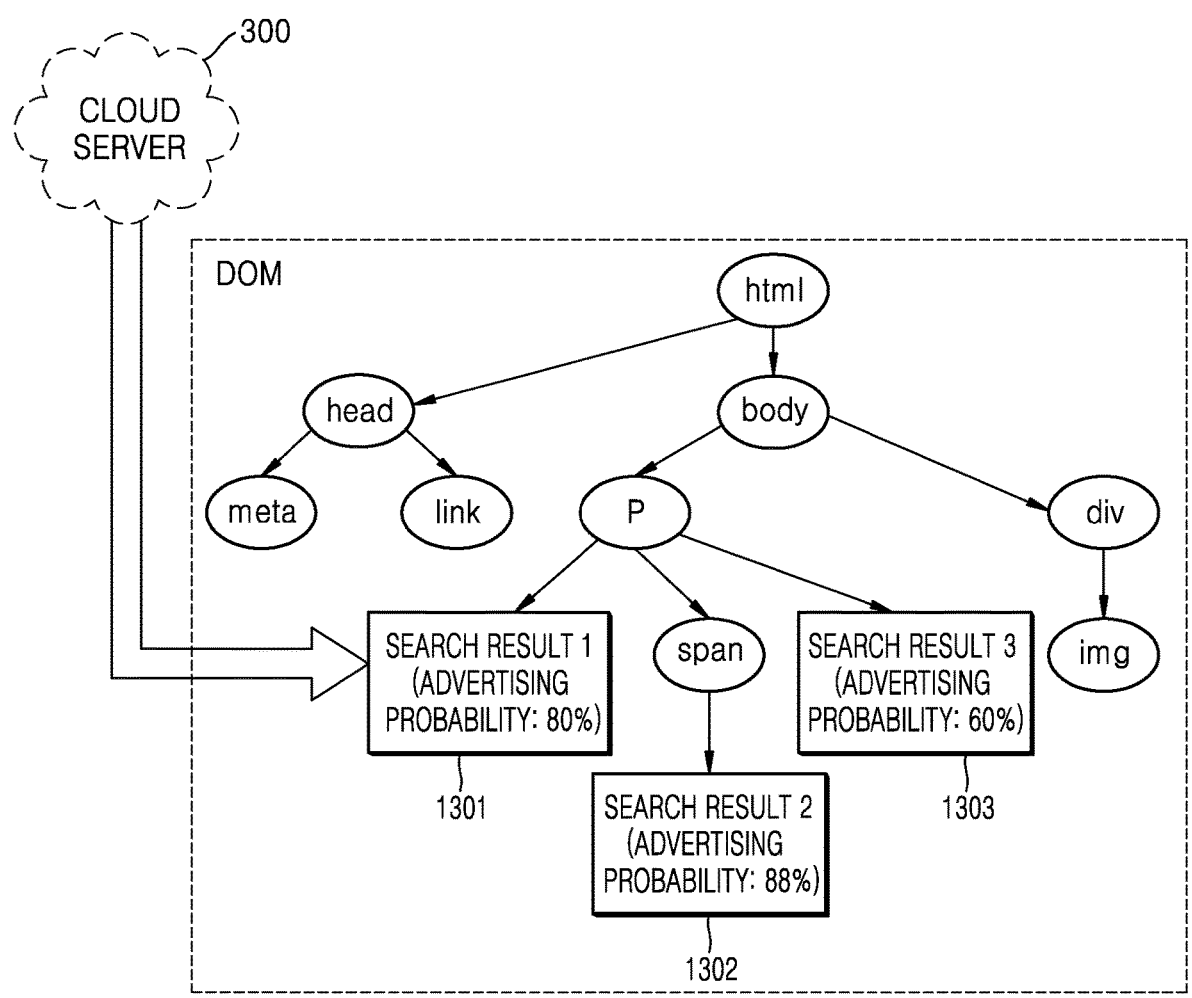
FIGS. 13 to 15 are diagrams for describing an example in which an electronic device displays search result data, based on additional information, according to an embodiment.
Figure 14:
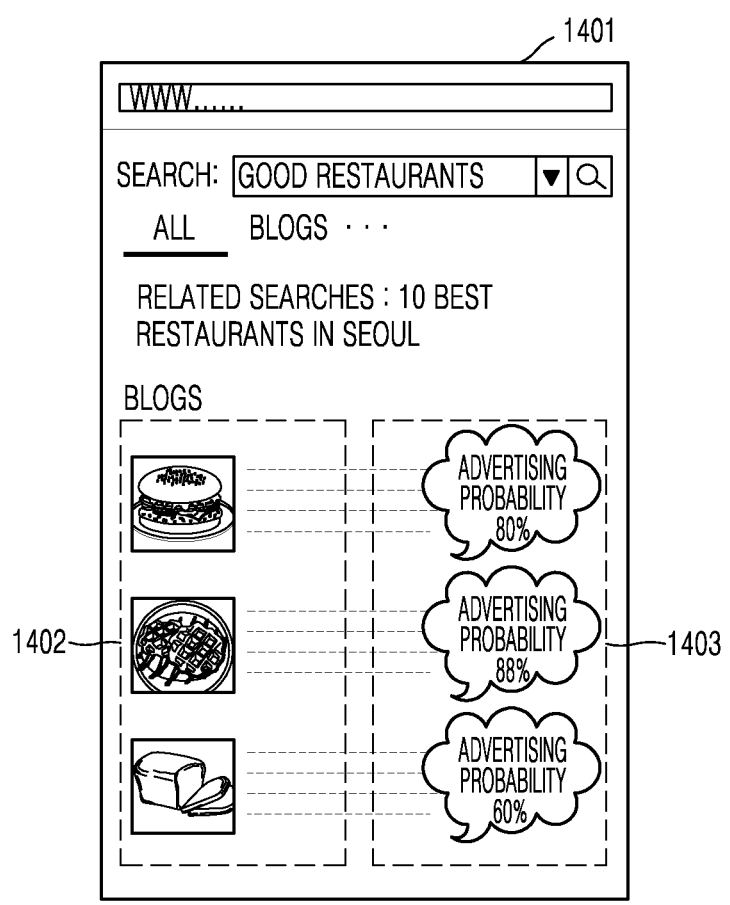
Figure 15:
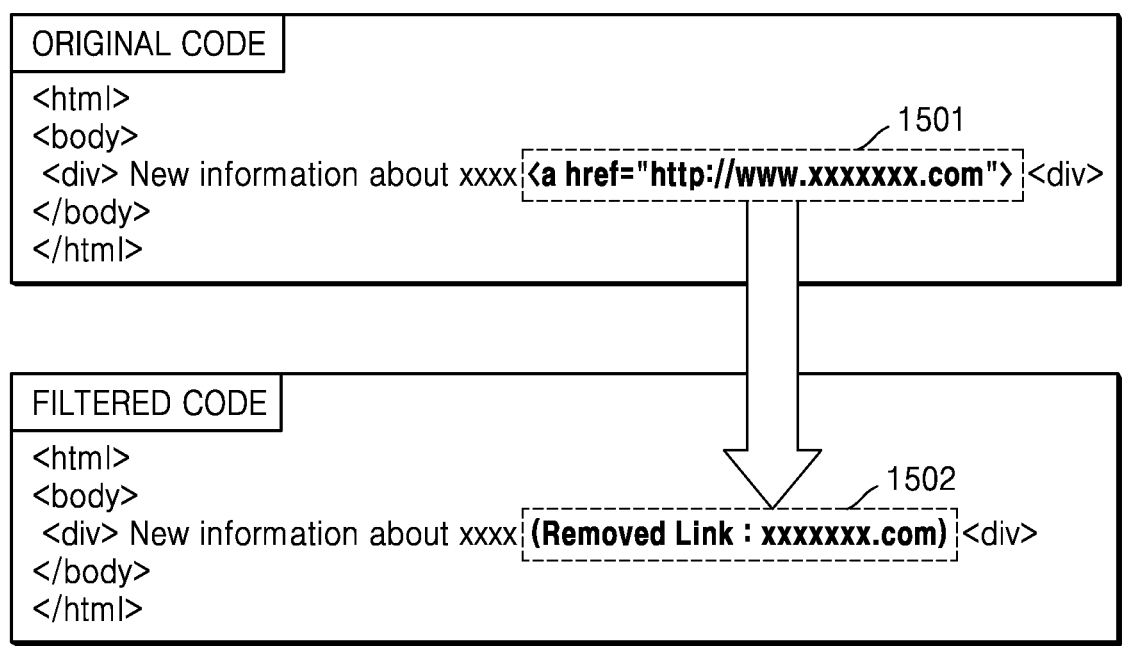

FIGS. 13 to 15 are diagrams for describing an example in which the electronic device 1000 displays search result data, based on additional information, according to an embodiment.

According to an embodiment, before search result data received from the first server 200 is displayed on the display 1210, the electronic device 1000 may request, from the second server 300, additional information indicating whether each web page included in the search result data is an advertising page. The electronic device 1000 may display the search result data, based on the additional information corresponding to each web page and received from the second server 300.

Referring to FIG. 13, the electronic device 1000 may add the additional information indicating whether the web page included in the search result data is an advertising page, which is received from the second server 300, e.g., a cloud server, to the search result data to be displayed on the display 1210.

For example, when the search result data to be displayed on the display 1210 is provided in the format of a hypertext markup language (HTML) document, the electronic device 1000 may insert the additional information into the last node of a document object model (DOM) tree of the HTML document.

According to an embodiment, the additional information may be probability information that the web page included in the search result data is an advertising page.

For example, the electronic device 1000 may insert the probability information into the last node of the DOM tree in such a manner that probability information 1301 corresponding to search result 1 (e.g., advertising probability: 80%), probability information 1302 corresponding to search result 2 (e.g., advertising probability: 88%), and probability information 1303 corresponding to search result 3 (e.g., advertising probability: 60%) are displayed together with the search results.

Referring to FIG. 14, for example, the electronic device 1000 may display, on a launch screen 1401 of a search engine, a list 1402 of found websites and probability information 1403 that each website is an advertising page. For example, the probability information 1403 indicating that a web page corresponding to a first search result has an advertising probability of 80%, that a web page corresponding to a second search result has an advertising probability of 88%, and that a web page corresponding to a third search result has an advertising probability of 60% may be displayed.

As such, a user may recognize web pages having high advertising probabilities from among the search results without accessing web pages included in the search results. The user may recognize advertising pages in advance from among the search results and thus may obtain effective information within a short time.

According to an embodiment, the electronic device 1000 may display, on the launch screen 1401 of the search engine, the list 1402 of the found websites and the number of pages of which advertising probabilities are greater than or equal to a preset threshold (e.g., 80%), in the list 1402 of the found websites (e.g., 8 advertising pages out of 20 found web pages).

According to an embodiment, the electronic device 1000 may determine a list of web pages to be displayed on the display 1210, from among the web pages included in the search result data, based on the additional information corresponding to the web pages.

Referring to FIG. 15, the electronic device 1000 may generate HTML code 1502 by excluding web pages of which advertising probability information is greater than or equal to a preset threshold (e.g., 80%), from original HTML code 1501 including link information of found web pages.

According to an embodiment, the second server 300 may transmit, to the electronic device 1000, data obtained by excluding web pages of which advertising probability information is greater than or equal to the preset threshold, from the list of the websites included in the search result data.

According to an embodiment, the user may receive the search result data from which web pages having high advertising probabilities are excluded, and thus obtain effective information within a short time.

FIGS. 13 to 15 merely illustrate an embodiment and the disclosure is not limited thereto.

FIG. 16 is a block diagram of the electronic device 1000 according to an embodiment. FIG. 17 is a detailed block diagram of the electronic device 1000 according to an embodiment.

As illustrated in FIG. 16, the electronic device 1000 according to an embodiment may include a display 1210, a communicator 1500, and a processor 1300. However, not all of the elements illustrated in FIG. 16 are essential elements of the electronic device 1000. The electronic device 1000 may be implemented by a larger or smaller number of elements compared to the elements illustrated in FIG. 16.

For example, as illustrated in FIG. 17, in addition to the display 1210, the communicator 1500, and the processor 1300, the electronic device 1000 according to an embodiment may further include a user inputter 1100, an outputter 1200, a sensor 1400, an audio/video (A/V) inputter 1600, and a storage 1700.

The user inputter 1100 refers to a means used by a user to input data for controlling the electronic device 1000. For example, the user inputter 1100 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto. The user inputter 1100 may be connected to a microphone 1620 to receive voice input for controlling the electronic device 1000.

The outputter 1200 may output an audio signal, a video signal, or a vibration signal, and include the display 1210, a sound outputter 1220, and a vibration motor 1230.

The display 1210 outputs information processed in the electronic device 1000.

According to an embodiment, the display 1210 may display search result data based on a search keyword under the control of the processor 1300.

The display 1210 may display probability information that each web page included in the search result data is an advertising page, under the control of the processor 1300.

The display 1210 may display a user interface for receiving a web page preference, under the control of the processor 1300.

Meanwhile, when the display 1210 and a touchpad are layered to configure a touchscreen, the display 1210 may be used not only as an output device but also as an input device. The display 1210 may include at least one of a liquid crystal display, a thin film transistor-liquid crystal display, an organic light-emitting diode, a flexible display, a three-dimensional (3D) display, and an electrophoretic display.

The display 1210 may include a light-emitting device (not shown). The light-emitting device may include, for example, a light-emitting diode and a display panel, but is not limited thereto.

The sound outputter 1220 outputs sound data received from the communicator 1500 or stored in the storage 1700. The vibration motor 1230 may output a vibration signal.

The processor 1300 generally controls overall operations of the electronic device 1000. For example, the processor 1300 may execute programs stored in the storage 1700 to control the user inputter 1100, the outputter 1200, the sensor 1400, the communicator 1500, and the A/V inputter 1600. The processor 1300 may control operations of the electronic device 1000 to perform the functions of the electronic device 1000 described above in relation to FIGS. 1 to 15.

According to an embodiment, the processor 1300 may receive a search keyword and request search result data based on the search keyword from the first server 200 (see FIG. 3) through the communicator 1500.

According to an embodiment, the processor 1300 may receive the search result data based on the search keyword from the first server 200 (see FIG. 3) through the communicator 1500.

The processor 1300 may request, from the second server 300 (see FIG. 3) through the communicator 1500, additional information indicating whether each web page included in the search result data is an advertising page.

The processor 1300 may control the display 1210 to display the search result data, based on the additional information corresponding to each web page and received from the second server 300 (see FIG. 3).

The processor 1300 may control the display 1210 to display a list of web pages included in the search result data, and probability information corresponding to each web page.

The processor 1300 may determine a list of web pages to be displayed on the display 1210 from among the web pages included in the search result data, based on the additional information corresponding to each web page.

The processor 1300 may exclude web pages of which advertising probability information is greater than or equal to a preset threshold, from among the web pages included in the search result data, from the list of web pages to be displayed on the display 1210.

The sensor 1400 may detect a status of the electronic device 1000 or an ambient environment status of the electronic device 1000, and transmit the detected information to the processor 1300.

The sensor 1400 may include at least one of a magnetic sensor 1410, an acceleration sensor 1420, a temperature/humidity sensor 1430, an infrared sensor 1440, a gyroscope sensor 1450, a location sensor (e.g., a global positioning system (GPS)) 1460, a barometric pressure sensor 1470, a proximity sensor 1480, and an RGB (or illuminance) sensor 1490, but is not limited thereto. Functions of the sensors may be intuitively inferred from their names by one of ordinary skill in the art, and thus a detailed description thereof is not provided herein.

The communicator 1500 may include one or more elements for enabling the electronic device 1000 to communicate with an external device. For example, the communicator 1500 may include a short-range wireless communicator 1510, a mobile communicator 1520, and a broadcast receiver 1530.

The short-range wireless communicator 1510 may include a Bluetooth communicator, a Bluetooth low energy (BLE) communicator, a near-field communication (NFC) communicator, a wireless local area network (WLAN) (or Wi-Fi) communicator, a Zigbee communicator, an infrared data association (IrDA) communicator, a Wi-Fi direct (WFD) communicator, a ultra-wideband (UWB) communicator, or an Ant+ communicator, but is not limited thereto.

The mobile communicator 1520 transmits and receives wireless signals to and from at least one of a base station, an external device, or a server in a mobile communication network. Herein, the wireless signals may include various types of data based on transmission and reception of voice call signals, video call signals, or text/multimedia messages.

The broadcast receiver 1530 receives broadcast signals and/or broadcast information through broadcast channels from outside. The broadcast channels may include satellite channels and terrestrial channels. Depending on implementation, the electronic device 1000 may not include the broadcast receiver 1530.

The A/V inputter 1600 is used to input audio signals or video signals, and may include, for example, a camera 1610 and a microphone 1620.

The camera 1610 may obtain image frames such as still images or videos by using an image sensor in a video call mode or a camera mode. The images captured by the image sensor may be processed through the processor 1300 or a separate image processor (not shown).

The image frames processed in the camera 1610 may be stored in the storage 1700 or be transmitted through the communicator 1500 to an external device. Depending on configuration, the camera 1610 may include two or more cameras.

The microphone 1620 receives an external sound signal and processes the same into electrical voice data. For example, the microphone 1620 may receive the sound signal from an external device or a user. The microphone 1620 may use various noise cancellation algorithms to cancel noise created while receiving the external sound signal.

The storage 1700 may store programs for processing and control operations of the processor 1300, and store data input to or to be output from the electronic device 1000.

The storage 1700 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the storage 1700 may be classified into a plurality of modules, e.g., a user interface (UI) module 1710, a touchscreen module 1720, a notification module 1730, and an image filtering module (not shown).

The UI module 1710 may provide a specialized UI or graphic user interface (GUI) connected to the electronic device 1000, per application. The touchscreen module 1720 may detect a touch gesture of the user on a touchscreen, and transmit information on the touch gesture to the processor 1300. The touchscreen module 1720 according to an embodiment may recognize and analyze touch code. The touchscreen module 1720 may be configured as separate hardware including a controller.

The notification module 1730 may generate a notification signal to notify that an event of the electronic device 1000 has occurred. Examples of the event occurring in the electronic device 1000 may include schedules, completion of execution of voice commands, and key signal inputs. The notification module 1730 may output the notification signal in the form of a video signal through the display 1210, in the form of an audio signal through the sound outputter 1220, or in the form of a vibration signal through the vibration motor 1230.

Figure 18:
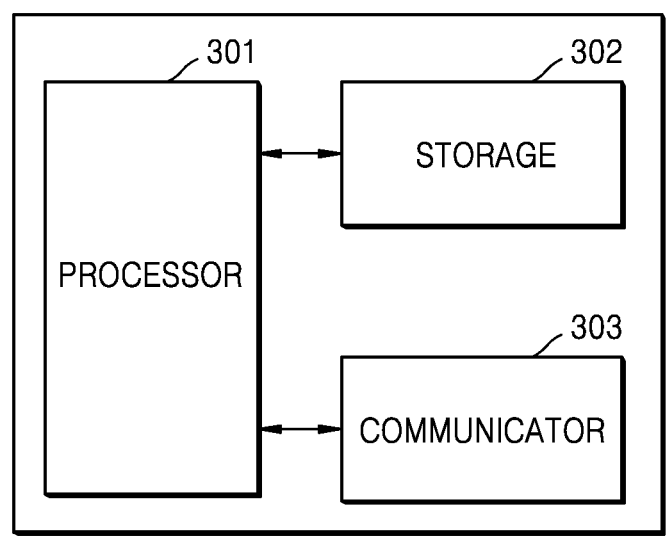
FIG. 18 is a block diagram of a second server according to an embodiment.

FIG. 18 is a block diagram of the second server 300 according to an embodiment.

FIG. 18 illustrates an example of the second server 300 (see FIG. 3).

The second server 300 may also include the elements illustrated in FIGS. 16 and 17.

As illustrated in FIG. 18, the second server 300 according to an embodiment may include a storage 302, a communicator 303, and a processor 301. However, not all of the elements illustrated in FIG. 18 are essential elements of the second server 300. The second server 300 may be implemented by a larger or smaller number of elements compared to the elements illustrated in FIG. 18.

According to an embodiment, the processor 301 of the second server 300 (see FIG. 3) may receive search result data based on a search keyword from the external electronic device 1000 (see FIG. 3) through the communicator 303.

According to an embodiment, the processor 301 of the second server 300 (see FIG. 3) may generate additional information indicating whether each web page included in the search result data is an advertising page.

The processor 301 may generate the additional information by using a training model trained using an AI algorithm, based on whether the web page includes an advertisement pattern.

According to an embodiment, the processor 301 may analyze advertisement patterns of advertising pages, generate virtual advertising pages, based on the analyzed advertisement patterns, and train the training model by using the virtual advertising pages.

The processor 301 may generate the additional information, based on at least one of a first score based on access history information of the web page, a second score based on preference information corresponding to a specific user, and a third score based on whether the web page includes an advertisement pattern.

The processor 301 may transmit the additional information through the communicator 303 to the external electronic device 1000 (see FIG. 3).

According to an embodiment, the storage 302 of the second server 300 (see FIG. 3) may store the training model trained to determine whether the web page is an advertising page, by using an AI algorithm.

According to an embodiment, the storage 302 of the second server 300 (see FIG. 3) may store access history information of each of a large number of web-crawled web pages.

According to an embodiment, the storage 302 of the second server 300 (see FIG. 3) may store preference information corresponding to a specific user for each of a large number of web-crawled web pages.

Figure 19:
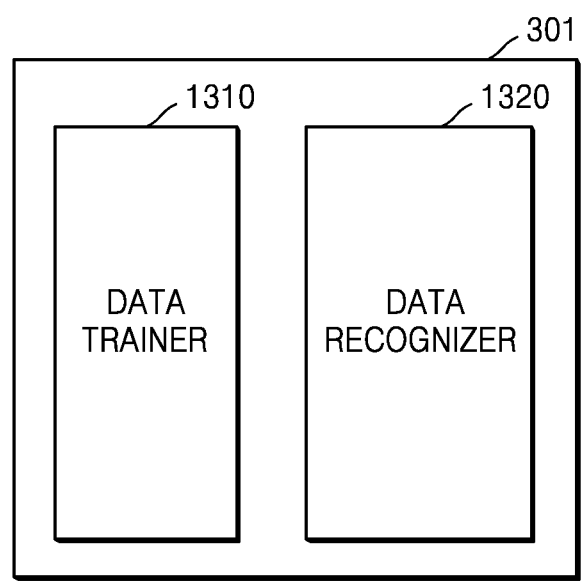
FIG. 19 is a block diagram of a processor of a second server according to an embodiment.

FIG. 19 is a block diagram of the processor 301 of the second server 300 according to an embodiment.

FIG. 19 illustrates an example of the processor 301 of the second server 300 (see FIG. 3).

Referring to FIG. 19, the processor 301 according to an embodiment may include a data trainer 1310 and a data recognizer 1320.

The data trainer 1310 may learn criteria for situational judgment. The data trainer 1310 may learn criteria on what data to use to judge a certain situation, and on how to judge a situation by using the data. The data trainer 1310 may learn the criteria for situational judgment by obtaining data to be used for training, and applying the obtained data to a data recognition model to be described below.

The data recognizer 1320 may judge a situation based on the data. The data recognizer 1320 may recognize a situation based on certain data by using the trained data recognition model. The data recognizer 1320 may judge a certain situation based on the certain data by obtaining certain data according to preset criteria based on learning, and using the data recognition model by using the obtained data as an input value. A result value output from the data recognition model by using the obtained data as the input value may be used to refine the data recognition model.

At least one of the data trainer 1310 and the data recognizer 1320 may be produced in the form of at least one hardware chip and be mounted in an electronic device. For example, at least one of the data trainer 1310 and the data recognizer 1320 may be produced in the form of a dedicated hardware chip for AI or as a part of a general-purpose processor (e.g., a central processing unit (CPU) or an application processor) or a dedicated graphics processor (e.g., a graphics processing unit (GPU)), and be mounted in various electronic devices.

In this case, the data trainer 1310 and the data recognizer 1320 may be mounted in one electronic device or be mounted separately in different electronic devices. For example, one of the data trainer 1310 and the data recognizer 1320 may be included in an electronic device, and the other may be included in a server. In a wired or wireless manner, model information constructed by the data trainer 1310 may be provided to the data recognizer 1320, and data input to the data recognizer 1320 may be provided to the data trainer 1310 as additional training data.

Meanwhile, at least one of the data trainer 1310 and the data recognizer 1320 may be implemented as a software module. When at least one of the data trainer 1310 and the data recognizer 1320 is implemented as a software module (or a program module including instructions), the software module may be stored in non-transitory computer-readable media. In this case, at least one software module may be provided by an operating system (OS) or by a certain application. Alternatively, a part of at least one software module may be provided by an OS and the other part may be provided by a certain application.

Figure 20:
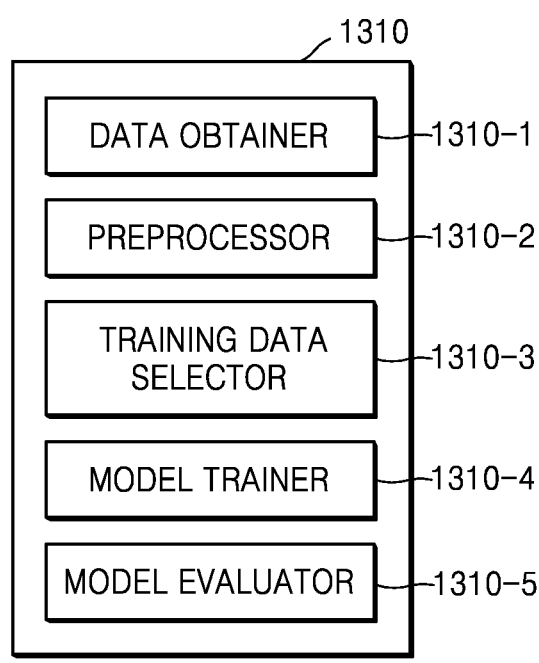
FIG. 20 is a block diagram of a data trainer according to an embodiment.

FIG. 20 is a block diagram of the data trainer 1310 according to an embodiment.

Referring to FIG. 20, the data trainer 1310 according to an embodiment may include a data obtainer 1310-1, a preprocessor 1310-2, a training data selector 1310-3, a model trainer 1310-4, and a model evaluator 1310-5.

The data obtainer 1310-1 may obtain data required for situational judgment. The data obtainer 1310-1 may obtain data required for training for situational judgment.

For instance, the data obtainer 1310-1 may receive the data input through an input device (e.g., a microphone, a camera, or a sensor) of an electronic device. Alternatively, the data obtainer 1310-1 may obtain the data through an external device that communicates with an electronic device. The data obtainer 1310-1 may receive the data from a server.

According to an embodiment, the data obtainer 1310-1 may obtain image frames or voice signals.

For example, the data obtainer 1310-1 may receive an ambient environment image of the electronic device 1000. The ambient environment image may include a plurality of images (or frames). For instance, the data obtainer 1310-1 may receive a video input through a camera of the electronic device 1000 including the data trainer 1310, or an external camera (e.g., a closed-circuit television (CCTV) or a black box) communicable with the electronic device 1000 including the data trainer 1310. Herein, the camera may include one or more image sensors (e.g., front sensors or rear sensors), lenses, image signal processors (ISPs), or flash lights (e.g., light-emitting diode (LED) or xenon lamps).

According to an embodiment, the data obtainer 1310-1 may obtain voice signals input through the microphone 1620 (see FIG. 17).

The preprocessor 1310-2 may preprocess the obtained data to be usable for training for situational judgment. The preprocessor 1310-2 may process the obtained data to a preset format in such a manner that the model trainer 1310-4 to be described below may use the obtained data for training for situational judgment. For example, the preprocessor 1310-2 may generate one composite image by overlapping at least parts of a plurality of images (or frames) for configuring at least a part of the input video, based on common regions included in the plurality of images. In this case, a plurality of composite images may be generated based on one video. The common regions may be regions including the same or similar common objects (e.g., things, animals, plants, or people) in the plurality of images. Alternatively, the common regions may be regions having the same or similar colors, brightnesses, RGB values, or CMYK values in the plurality of images.

The training data selector 1310-3 may select data required for training, in the preprocessed data. The selected data may be provided to the model trainer 1310-4. The training data selector 1310-3 may select the data required for training, in the preprocessed data according to preset criteria for situational judgment. The training data selector 1310-3 may select the data according to preset criteria based on learning by the model trainer 1310-4 to be described below.

For example, a large number of advertising pages obtained through web crawling may be selected.

For example, virtual advertising pages generated based on advertisement patterns of advertising pages may be selected.

The model trainer 1310-4 may learn criteria on how to judge a situation, based on training data. The model trainer 1310-4 may learn criteria on what training data to use to judge a situation.

According to an embodiment, the model trainer 1310-4 may learn criteria for determining whether a voice signal corresponds to voice uttered by a user or voice output from an external device, based on voice feature data.

The model trainer 1310-4 may train a data recognition model used for situational judgment, by using the training data. In this case, the data recognition model may be a pre-constructed model. For example, the data recognition model may be a model pre-constructed by receiving basic training data (e.g., sample images or sample voice signals).

The data recognition model may be constructed considering an application field of a recognition model, the purpose of learning, or the computing performance of a device. The data recognition model may be, for example, a model based on a neural network. For example, the data recognition model may use a deep neural network (DNN), a recurrent neural network (RNN), or a bidirectional recurrent deep neural network (BRDNN), but is not limited thereto.

According to various embodiments, when a plurality of pre-constructed data recognition models are present, the model trainer 1310-4 may determine a data recognition model trained with basic training data highly relevant to the input training data, as a data recognition model to be trained. In this case, the basic training data may be pre-classified based on data types, and the data recognition models may be pre-constructed based on the data types. For example, the basic training data may be pre-classified based on various criteria such as an area where training data is generated, a time when training data is generated, a size of training data, a genre of training data, a generator of training data, and a type of an object in training data.

The model trainer 1310-4 may train the data recognition model by using a learning algorithm including, for example, error back-propagation or gradient descent.

The model trainer 1310-4 may train the data recognition model through, for example, supervised learning using training data as input values. The model trainer 1310-4 may train the data recognition model through, for example, unsupervised learning for finding criteria for situational judgment, by autonomously learning a type of data required for situational judgment without any supervision. The model trainer 1310-4 may train the data recognition model through, for example, reinforcement learning using feedback on whether a result of situational judgment based on learning is correct.

When the data recognition model is trained, the model trainer 1310-4 may store the trained data recognition model. In this case, the model trainer 1310-4 may store the trained data recognition model in a memory of an electronic device including the data recognizer 1320. Alternatively, the model trainer 1310-4 may store the trained data recognition model in a memory of an electronic device including the data recognizer 1320 to be described below. Alternatively, the model trainer 1310-4 may store the trained data recognition model in a memory of a server connected to an electronic device through a wired or wireless network.

In this case, the memory in which the trained data recognition model is stored may also store, for example, commands or data related to at least one other element of an electronic device. The memory may also store software and/or programs. The programs may include, for example, a kernel, middleware, an application programming interface (API), and/or application programs (or "applications").

The model evaluator 1310-5 may input evaluation data to the data recognition model, and request the model trainer 1310-4 to learn again when results output using the evaluation data do not satisfy a certain criterion. In this case, the evaluation data may be preset data for evaluating the data recognition model.

For example, when the number or a ratio of pieces of the evaluation data related to inaccurate results from among the results of the trained data recognition model for the evaluation data exceeds a preset threshold, the model evaluator 1310-5 may evaluate that the certain criterion is not satisfied. For example, when the certain criterion is defined as a ratio of 2% and when the trained data recognition model outputs wrong results for more than 20 pieces out of a total of 1,000 pieces of the evaluation data, the model evaluator 1310-5 may evaluate that the trained data recognition model is not appropriate.

Meanwhile, when a plurality of trained data recognition models are present, the model evaluator 1310-5 may evaluate whether each of the trained data recognition models satisfies the certain criterion and determine a model satisfying the certain criterion, as a final data recognition model. In this case, when a plurality of data recognition models satisfy the certain criterion, the model evaluator 1310-5 may determine one or more data recognition models preset in order of evaluation scores, as final data recognition models.

Meanwhile, at least one of the data obtainer 1310-1, the preprocessor 1310-2, the training data selector 1310-3, the model trainer 1310-4, and the model evaluator 1310-5 in the data trainer 1310 may be produced in the form of at least one hardware chip and be mounted in an electronic device. For example, at least one of the data obtainer 1310-1, the preprocessor 1310-2, the training data selector 1310-3, the model trainer 1310-4, and the model evaluator 1310-5 may be produced in the form of a dedicated hardware chip for AI or as a part of a general-purpose processor (e.g., a CPU or an application processor) or a dedicated graphics processor (e.g., a GPU), and be mounted in various electronic devices.

The data obtainer 1310-1, the preprocessor 1310-2, the training data selector 1310-3, the model trainer 1310-4, and the model evaluator 1310-5 may be mounted in one electronic device or be mounted separately in different electronic devices. For example, some of the data obtainer 1310-1, the preprocessor 1310-2, the training data selector 1310-3, the model trainer 1310-4, and the model evaluator 1310-5 may be included in an electronic device, and the others may be included in a server.

At least one of the data obtainer 1310-1, the preprocessor 1310-2, the training data selector 1310-3, the model trainer 1310-4, and the model evaluator 1310-5 may be implemented as a software module. When at least one of the data obtainer 1310-1, the preprocessor 1310-2, the training data selector 1310-3, the model trainer 1310-4, and the model evaluator 1310-5 is implemented as a software module (or a program module including instructions), the software module may be stored in non-transitory computer-readable media. In this case, at least one software module may be provided by an OS or by a certain application. Alternatively, a part of at least one software module may be provided by an OS and the other part may be provided by a certain application.

Figure 21:
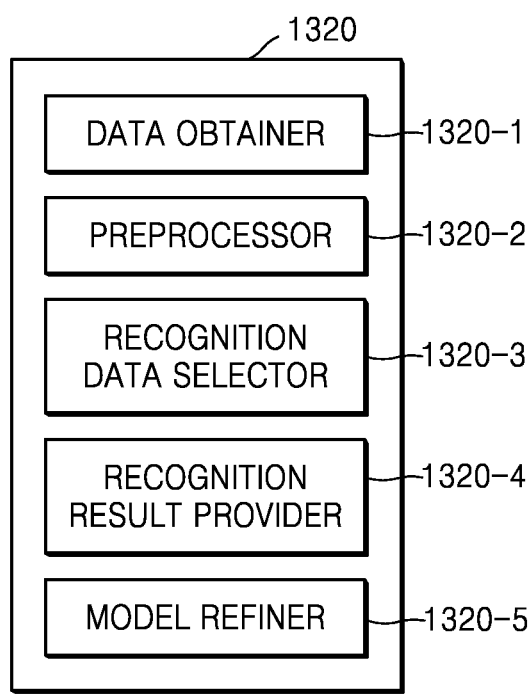
FIG. 21 is a block diagram of a data recognizer according to an embodiment.

FIG. 21 is a block diagram of the data recognizer 1320 according to an embodiment.

Referring to FIG. 21, the data recognizer 1320 according to an embodiment may include a data obtainer 1320-1, a preprocessor 1320-2, a recognition data selector 1320-3, a recognition result provider 1320-4, and a model refiner 1320-5.

The data obtainer 1320-1 may obtain data required for situational judgment, and the preprocessor 1320-2 may preprocess the obtained data to be usable for situational judgment. The preprocessor 1320-2 may process the obtained data to a preset format in such a manner that the recognition result provider 1320-4 to be described below may use the obtained data for situational judgment.

The recognition data selector 1320-3 may select data required for situational judgment, in the preprocessed data. The selected data may be provided to the recognition result provider 1320-4. The recognition data selector 1320-3 may select a part or the entirety of the preprocessed data according to preset criteria for situational judgment. The recognition data selector 1320-3 may select the data according to preset criteria based on learning by the model trainer 1310-4 to be described above.

The recognition result provider 1320-4 may judge a situation by applying the selected data to a data recognition model. The recognition result provider 1320-4 may provide a recognition result according to the purpose of data recognition. The recognition result provider 1320-4 may apply the selected data to the data recognition model by using, as an input value, the data selected by the recognition data selector 1320-3. The recognition result may be determined by the data recognition model.

According to an embodiment, probability information that an input web page is an advertising page may be provided.

The model refiner 1320-5 may allow the data recognition model to be refined, based on evaluation of the recognition result provided by the recognition result provider 1320-4. For example, the model refiner 1320-5 may provide the recognition result provided by the recognition result provider 1320-4, to the model trainer 1310-4 such that the model trainer 1310-4 may refine the data recognition model.

Meanwhile, at least one of the data obtainer 1320-1, the preprocessor 1320-2, the recognition data selector 1320-3, the recognition result provider 1320-4, and the model refiner 1320-5 in the data recognizer 1320 may be produced in the form of at least one hardware chip and be mounted in an electronic device. For example, at least one of the data obtainer 1320-1, the preprocessor 1320-2, the recognition data selector 1320-3, the recognition result provider 1320-4, and the model refiner 1320-5 may be produced in the form of a dedicated hardware chip for AI or as a part of a general-purpose processor (e.g., a CPU or an application processor) or a dedicated graphics processor (e.g., a GPU), and be mounted in various electronic devices.

The data obtainer 1320-1, the preprocessor 1320-2, the recognition data selector 1320-3, the recognition result provider 1320-4, and the model refiner 1320-5 may be mounted in one electronic device or be mounted separately in different electronic devices. For example, some of the data obtainer 1320-1, the preprocessor 1320-2, the recognition data selector 1320-3, the recognition result provider 1320-4, and the model refiner 1320-5 may be included in an electronic device, and the others may be included in a server.

At least one of the data obtainer 1320-1, the preprocessor 1320-2, the recognition data selector 1320-3, the recognition result provider 1320-4, and the model refiner 1320-5 may be implemented as a software module. When at least one of the data obtainer 1320-1, the preprocessor 1320-2, the recognition data selector 1320-3, the recognition result provider 1320-4, and the model refiner 1320-5 is implemented as a software module (or a program module including instructions), the software module may be stored in non-transitory computer-readable media. In this case, at least one software module may be provided by an OS or by a certain application. Alternatively, a part of at least one software module may be provided by an OS and the other part may be provided by a certain application.

Figure 22:
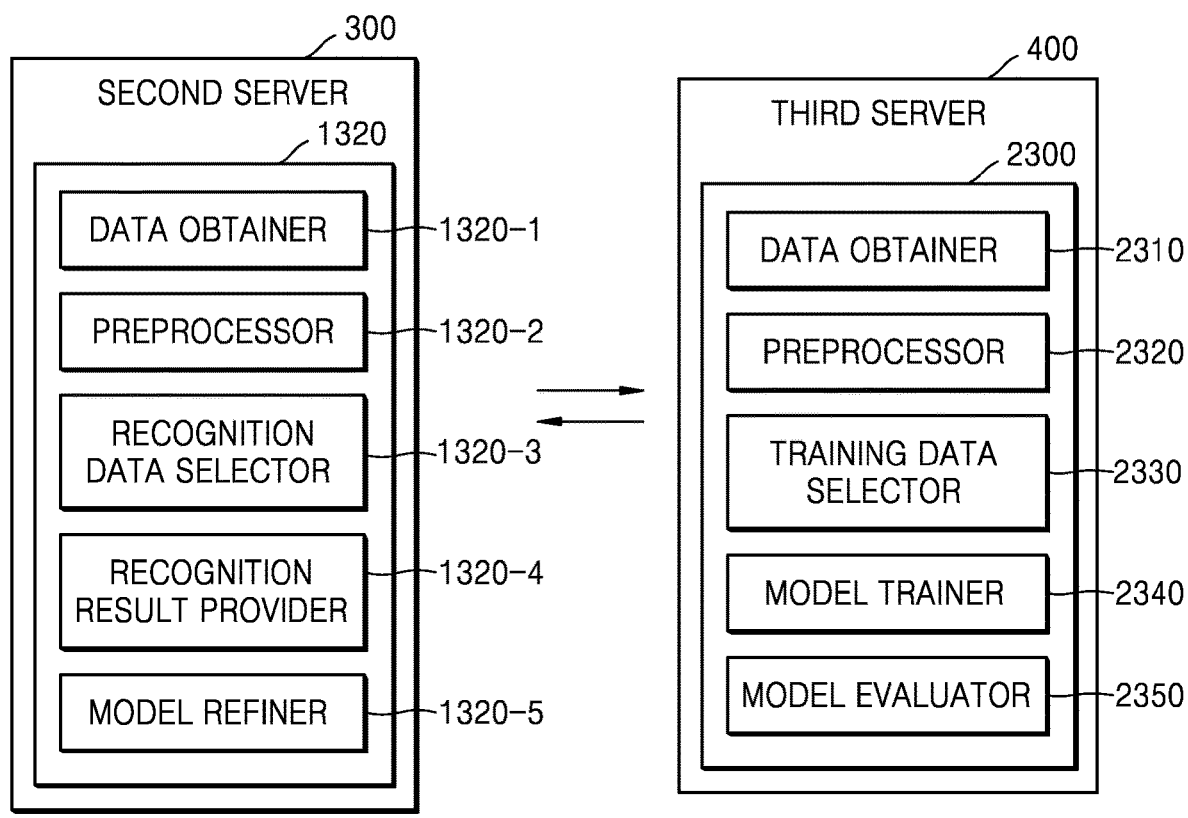
FIG. 22 is a diagram showing an example in which a second server cooperates with another server to learn and recognize data, according to an embodiment.

FIG. 22 is a diagram showing an example in which the second server 300 cooperates with another server to learn and recognize data, according to an embodiment.

FIG. 22 is a diagram showing an example in which the second server 300 and a third server 400 according to an embodiment cooperate with each other to learn and recognize data.

Referring to FIG. 22, the third server 400 may learn criteria for situational judgment, and the second server 300 may judge a situation, based on a result of learning by the third server 400.

In this case, a model trainer 2340 of the third server 400 may function as the data trainer 1310 illustrated in FIG. 20. The model trainer 2340 of the third server 400 may learn criteria on what data to use to judge a certain situation, and on how to judge a situation by using the data. The model trainer 2340 may learn the criteria for situational judgment by obtaining data to be used for training, and applying the obtained data to a data recognition model to be described below.

The recognition result provider 1320-4 of the second server 300 may judge a situation by applying the data selected by the recognition data selector 1320-3 to a data recognition model generated by the third server 400. For example, the recognition result provider 1320-4 may transmit the data selected by the recognition data selector 1320-3, to the third server 400 and request the third server 400 to judge a situation by applying the data selected by the recognition data selector 1320-3 to the data recognition model. The recognition result provider 1320-4 may receive, from the third server 400, information on the situation judged by the third server 400.

For example, the third server 400 may learn a large number of advertising pages.

For example, the second server 300 may determine probability information that an input page is an advertising page.

Alternatively, the recognition result provider 1320-4 of the second server 300 may receive, from the third server 400, the data recognition model generated by the third server 400, and judge a situation by using the received data recognition model. In this case, the recognition result provider 1320-4 of the second server 300 may judge the situation by applying the data selected by the recognition data selector 1320-3 to the data recognition model received from the third server 400.

Meanwhile, the afore-described embodiments may be written as programs executable on a computer, and be implemented by a general-purpose digital computer for operating the programs by using a computer-readable medium. Data structures used in the afore-described embodiments may be recorded on the computer-readable medium via a variety of means. The afore-described embodiments may be implemented in the form of a recording medium including instructions executable by the computer, e.g., a program module executed by the computer. For example, methods implemented by software modules or algorithms may be stored in a computer-readable medium as computer-readable codes or program commands executable by the computer.

The computer-readable medium may be an arbitrary recording medium accessible by the computer, and examples thereof may include volatile, non-volatile, detachable, and non-detachable media. Examples of the computer-readable medium include magnetic storage media (e.g., read-only memory (ROM), floppy disks, and hard disks) and optical recording media (e.g., compact disc-ROM (CD-ROM) and digital versatile discs (DVDs)), but are not limited thereto The computer-readable medium may include a computer storage medium and a communication medium.

A plurality of computer-readable recording media may be distributed over network-coupled computer systems, and data, e.g., program instructions and codes, stored in the distributed recording media may be executed by at least one computer.

Particular implementations described herein merely correspond to embodiments and do not limit the scope of the disclosure in any way. For brevity, descriptions of known electronic configurations, control systems, software, and other functional aspects of the systems may not be provided herein.

While the disclosure has been particularly shown and described with reference to embodiments thereof, it will be understood by one of ordinary skill in the art that various changes in form and details may be made therein without departing from the scope of the disclosure. Therefore, it should be understood that the afore-described embodiments are illustrative in all aspects and do not limit the disclosure. For example, each element described as a single element may be implemented in a distributed manner and, likewise, elements described as distributed elements may be implemented in a combined manner.

All examples and terms used herein are merely for a detailed description of the disclosure and the scope of the disclosure is not limited by those examples and terms unless defined in the claims.

Moreover, no element is essential for implementation of the disclosure unless the element is particularly described as being "essential" or "critical".

It will be understood by one of ordinary skill in the art that the embodiments of the disclosure may be modified without departing from the scope of the disclosure.

It should be understood that various changes in form and details may be made in the embodiments of the disclosure and that the embodiments of the disclosure cover all modifications, equivalents, and alternatives falling within the scope of the disclosure. Therefore, the afore-described embodiments should be considered in a descriptive sense only and not for purposes of limitation.

The scope of the disclosure is defined not by the detailed description of the disclosure but by the appended claims, and all variations derived from the scope defined by the claims and their equivalents will be construed as being included in the scope of the disclosure.

As used herein, the term " . . . unit" or "module" denotes an entity for performing at least one function or operation, and may be implemented using hardware, software, or a combination of hardware and software.

The "unit" or "module" may also be implemented as a program stored in an addressable storage medium and executable by a processor.

For example, the term "unit" or "module" may be implemented as elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

As used herein, the expression "A may include one of a1, a2, and a3" broadly means that an example of an element that may be included in element A is a1, a2, or a3.

The expression does not limit the element that may be included in element A, to a1, a2, or a3. Therefore, it should be noted that the expression is not restrictively construed to exclude elements other than a1, a2, and a3, from examples of the element that may be included in A.

The expression means that A may include a1, include a2, or include a3. The expression does not mean that elements included in A are always selectively determined within a certain set. For example, it should be noted that the expression is not restrictively construed to limit the element included in element A, to a1, a2, or a3 selected from a set including a1, a2, and a3.

The invention claimed is:

1. An electronic device comprising:
a communicator;
a display; and
a processor configured to:
    receive, from a first server through the communicator, search result data based on a search keyword;
    transmit, to a second server through the communicator, a request for additional information indicating whether each web page comprised in the search result data is an advertising page, the additional information comprising probability information that the web page is an advertising page, the request comprising the received search result data;
    receive, from the second server through the communicator, the additional information corresponding to the each web page comprised in the search result data; and
    control the display to display a list of web pages comprised in the search result data and the probability information that the each web page is an advertising page based on the received additional information corresponding to the each web page,
wherein the additional information and the probability information are generated by the second server, based on whether the web page comprises an advertisement pattern,
wherein to generate the additional information and the probability information, the second server inputs the web page into a training model trained using an artificial intelligence (AI) algorithm that determines whether the inputted web page comprises the advertisement pattern,
wherein the additional information is generated based on at least one of a first score based on access history information of the web page, a second score based on preference information corresponding to a specific user, and a third score based on whether the web page comprises the advertisement pattern, and
wherein the access history information of the web page comprises at least one of a time on page from when the web page is accessed until when the access to the web page is terminated, and a bounce rate at which the web page is accessed and then the access to the web page is terminated without further accessing other web pages connectable in the web page.

2. The electronic device of claim 1, wherein the processor is further configured to determine the list of web pages to be displayed on the display from among web pages comprised in the search result data, based on the additional information corresponding to the each web page.

3. The electronic device of claim 2, wherein the processor is further configured to exclude web pages of which advertising probability information is greater than or equal to a preset threshold, from among the web pages comprised in the search result data, from the list of web pages to be displayed on the display.

4. The electronic device of claim 1, wherein the preference information corresponding to the specific user comprises at least one of information based on input of the specific user, and the access history information of the web page corresponding to the specific user.

5. The electronic device of claim 1, wherein the processor is further configured to:
receive the search keyword through a user interface of the electronic device; and
request, to the first server through the communicator, the search result data based on the search keyword.

6. The electronic device of claim 1, wherein the advertisement pattern includes at least one of:
at least a threshold number of business card images;
at least a threshold number of map images;
at least a threshold number of positive expressions and positive emoticons;
at least a threshold number of restaurant names;
at least a threshold number of addresses;
at least a threshold number of phone numbers;
at least a threshold number of sign images;
at least a threshold number of product images;
at least a threshold number of homepage hyperlinks; or
at least a threshold number of pictures focused on food.

7. The electronic device of claim 1, wherein the probability information is based on a probability score calculated as a sum of a product of a first score (A) based on access history information of a specific web page, and a weight (Aw) for the first score, a product of a second score (B) based on preference information corresponding to a specific user, and a weight (Bw) for the second score, and a third score (C) based on whether the specific web page includes an advertisement pattern.

8. An electronic device comprising:
a communicator;
a display; and
a processor configured to:
receive, from an external electronic device through the communicator, search result data based on a search keyword;
generate additional information indicating whether each web page comprised in the search result data is an advertising page, the additional information comprising probability information that the web page is an advertising page; and
transmit, to the external electronic device through the communicator, the additional information corresponding to the each web page comprised in the search result data,
wherein the processor is further configured to generate the additional information and the probability information, based on whether the web page comprises an advertisement pattern, by inputting the web page into a training model trained using an artificial intelligence (AI) algorithm that determines whether the inputted web page comprises the advertisement pattern,
wherein the processor is further configured to generate the additional information based on at least one of a first score based on access history information of the web page, a second score based on preference information corresponding to a specific user, and a third score based on whether the web page comprises the advertisement pattern,
wherein the access history information of the web page comprises at least one of a time on page from when the web page is accessed until when the access to the web page is terminated, and a bounce rate at which the web page is accessed and then the access to the web page is terminated without further accessing other web pages connectable in the web page, and
wherein the probability information that the each web page is an advertising page is displayed on a display of the external electronic device with a list of web pages comprised in the search result data.

9. The electronic device of claim 8, wherein the processor is further configured to:
analyze advertisement patterns of advertising pages;
generate virtual advertising pages, based on the analyzed advertisement patterns; and
train the training model by using the virtual advertising pages.

10. An operating method of an electronic device, the operating method comprising:
receiving, from a first server, search result data based on a search keyword;
transmitting, to a second server, a request for additional information indicating whether each web page comprised in the search result data is an advertising page, the additional information comprising probability information that the web page is an advertising page, the request comprising the received search result data;
receiving, from the second server through a communicator, the additional information corresponding to the each web page comprised in the search result data; and
controlling a display to display a list of web pages comprised in the search result data and the probability information that the each web page is an advertising page based on the received additional information corresponding to the each web page,
wherein the additional information and the probability information are generated by the second server, based on whether the web page comprises an advertisement pattern,
wherein to generate the additional information and the probability information, the second server inputs the web page into a training model trained using an artificial intelligence (AI) algorithm that determines whether the inputted web page comprises the advertisement pattern,
wherein the additional information is generated based on at least one of a first score based on access history information of the web page, a second score based on preference information corresponding to a specific user, and a third score based on whether the web page comprises the advertisement pattern, and
wherein the access history information of the web page comprises at least one of a time on page from when the web page is accessed until when the access to the web page is terminated, and a bounce rate at which the web page is accessed and then the access to the web page is terminated without further accessing other web pages connectable in the web page.

11. The operating method of claim 10, wherein the controlling of the display comprises determining the list of web pages to be displayed on the display from among web pages comprised in the search result data, based on the additional information corresponding to the each web page.

12. The operating method of claim 10, wherein the controlling of the display comprises excluding web pages of which advertising probability information is greater than or equal to a preset threshold, from among the web pages comprised in the search result data, from the list of web pages to be displayed on the display.

13. The operating method of claim 10, wherein further comprising:
- receiving the search keyword through a user interface of the electronic device; and
- requesting, from the first server through the communicator, the search result data based on the search keyword.

\* \* \* \* \*